United States Patent
Collier

(10) Patent No.: US 6,719,681 B2
(45) Date of Patent: Apr. 13, 2004

(54) METHODS FOR CENTRIFUGALLY SEPARATING MIXED COMPONENTS OF A FLUID STREAM

(75) Inventor: Kevin E. Collier, Kaysville, UT (US)

(73) Assignee: Econova, Inc., Kaysville, UT (US)

( * ) Notice: Subject to any disclaimer, the term of this patent is extended or adjusted under 35 U.S.C. 154(b) by 0 days.

(21) Appl. No.: 10/056,190

(22) Filed: Jan. 25, 2002

(65) Prior Publication Data

US 2002/0068676 A1 Jun. 6, 2002

Related U.S. Application Data

(63) Continuation-in-part of application No. 09/441,598, filed on Nov. 17, 1999, now Pat. No. 6,346,069.
(60) Provisional application No. 60/147,669, filed on Aug. 6, 1999.

(51) Int. Cl.⁷ .............................. B04B 1/04; B04B 11/00
(52) U.S. Cl. .................................. 494/37; 494/1; 494/3; 494/27; 494/29; 494/30; 494/74; 494/79; 210/741; 210/768; 210/787; 210/803; 210/808
(58) Field of Search .............................. 494/23, 27, 29, 494/30, 37, 74, 1, 3, 79; 210/739, 768, 803, 808, 741, 787, 97, 112, 115, 360.1, 380.1

(56) References Cited

U.S. PATENT DOCUMENTS

| | | |
|---|---|---|
| 315,876 A | 4/1885 | Zimmer |
| 382,966 A | 5/1888 | Freitag |
| 632,616 A | 9/1899 | Alfven |
| 635,488 A | 10/1899 | Kneeland |
| 699,217 A | 5/1902 | Mccomack |
| 690,833 A | 7/1902 | Sharples |
| 1,669,379 A | 1/1928 | Sperry |
| 1,664,769 A | 4/1928 | Chance |
| 1,782,974 A | 11/1930 | Rozieres |
| 1,811,157 A | 6/1931 | Schwerdtferger |
| 1,870,113 A | 8/1932 | Hawkins et al. |

(List continued on next page.)

FOREIGN PATENT DOCUMENTS

| | | |
|---|---|---|
| DE | 40702 | 9/1887 |
| DE | 321 855 | 6/1920 |
| DE | 610 608 | 3/1935 |

(List continued on next page.)

OTHER PUBLICATIONS

Technology in Perspective, *Giving Ear to Improve Centrifuge Performance*, 1990.
Brochure on ALFAX Self–Cleaning Centrifugal Separators with Controlled Partial Discharge—WHPX Series, No. PD A0717E5, ALFA–LAVAZ, 1990.
Brochure on ALFA–LAVAL Separation, No. PD 41075E, 1990.
*Multiphase Boosting and Metering*, The Products of Today for Tomorrow, Framo Engineering AS, Norway, 1992.
Tim Cornitius, *Advances in Water Treating Solving Production Problems*, Offshore, Mar. 1988, pp. 27–29.

*Primary Examiner*—David A. Reifsnyder
(74) *Attorney, Agent, or Firm*—Workman Nydegger

(57) ABSTRACT

A multiple-component fluid mixture is separated by feeding the fluid mixture into a chamber of a vessel through an inlet, the chamber being at least partially bounded by a peripheral wall and the chamber also communicating with an outlet. The fluid mixture includes a heavy component and a light component. The vessel is rotated about a rotational axis extending through the vessel such that the heavy component collects toward at least a portion of the peripheral wall of the vessel and the light component collects toward the rotational axis. The light component is removed through the outlet channel. The heavy component is removed through a conduit disposed within the chamber, the conduit extending from the heavy component toward the rotational axis and out of the vessel.

54 Claims, 27 Drawing Sheets

U.S. PATENT DOCUMENTS

| | | |
|---|---|---|
| 2,010,405 A | 8/1935 | MacIsaac |
| 2,067,590 A | 1/1937 | Ayres |
| 2,073,216 A | 3/1937 | Mann |
| 2,077,813 A | 4/1937 | Strezynski |
| 2,126,864 A | 8/1938 | Bath |
| 2,145,541 A | 1/1939 | Forsberg |
| 2,269,716 A | 1/1942 | Greg |
| 2,337,291 A | 12/1943 | Adams et al. |
| 2,422,646 A | 6/1947 | Bartholomew |
| 2,594,445 A | 4/1952 | Keith, Jr. |
| 2,719,668 A | 10/1955 | Bergner |
| 2,733,855 A | 2/1956 | McCoy |
| 2,870,912 A | 1/1959 | Mathieu |
| 3,059,282 A | 10/1962 | Smith |
| 3,081,027 A | 3/1963 | Coulson |
| 3,168,474 A | 2/1965 | Stallman et al. |
| 3,201,036 A | 8/1965 | Halbach et al. |
| 3,288,360 A | 11/1966 | Babelay et al. |
| 3,307,780 A | 3/1967 | Kompert |
| 3,341,093 A | 9/1967 | Putterlik |
| 3,408,000 A | 10/1968 | Nilson |
| 3,437,209 A | 4/1969 | Evans |
| 3,460,751 A | 8/1969 | Hemfort, Sr. |
| 3,494,545 A | 2/1970 | Nilson |
| 3,535,158 A | 10/1970 | McBridge et al. |
| 3,623,658 A | 11/1971 | Garbaty |
| 3,642,196 A | 2/1972 | Nilsson |
| 3,647,135 A | 3/1972 | Mercier |
| 3,655,058 A | 4/1972 | Novak |
| 3,702,704 A | 11/1972 | Bloch |
| 3,703,984 A | 11/1972 | Pruessner |
| 3,730,423 A | 5/1973 | Coulson |
| 3,750,940 A | 8/1973 | Nilsson |
| 3,752,389 A | 8/1973 | Nilsson |
| 3,774,840 A | 11/1973 | Boatright |
| 3,825,177 A | 7/1974 | Kohlstett |
| 3,847,327 A | 11/1974 | Erikson et al. |
| 3,883,114 A | 5/1975 | Harris et al. |
| 3,938,734 A | 2/1976 | Wilke |
| 3,991,935 A | 11/1976 | Henning |
| 4,015,773 A | 4/1977 | Thylefors |
| 4,098,696 A | 7/1978 | Humphrey et al. |
| 4,151,950 A | 5/1979 | Gunnewig |
| 4,175,040 A | 11/1979 | Sammons et al. |
| 4,190,530 A | 2/1980 | Forsythe, Jr. et al. |
| 4,199,459 A | 4/1980 | Filipowicz et al. |
| 4,295,600 A | 10/1981 | Saget |
| 4,308,136 A | 12/1981 | Wame, Jr. |
| 4,362,620 A | 12/1982 | High |
| 4,406,791 A | 9/1983 | Khapaev |
| 4,425,240 A | 1/1984 | Johnson |
| 4,431,540 A * | 2/1984 | Budzich ................ 210/380.1 |
| 4,477,348 A | 10/1984 | Ayers et al. |
| 4,525,155 A | 6/1985 | Nilsson |
| 4,556,528 A | 12/1985 | Gersch et al. |
| 4,626,237 A | 12/1986 | Galloway, Jr. |
| 4,634,416 A * | 1/1987 | Ehnstrom ................ 494/27 |
| 4,702,837 A | 10/1987 | Lecoffre et al. |
| 4,758,354 A | 7/1988 | O'Mara et al. |
| 4,776,833 A | 10/1988 | Knelson |
| 4,810,240 A | 3/1989 | Zuccato |
| 4,820,256 A * | 4/1989 | Nordstrom ................ 494/27 |
| 4,846,780 A | 7/1989 | Galloway et al. |
| 4,855,050 A | 8/1989 | Senyard, Sr. et al. |
| 4,857,040 A | 8/1989 | Kashihara et al. |
| 4,871,458 A | 10/1989 | Purvey |
| 4,936,821 A | 6/1990 | Zuccato |
| 4,959,158 A | 9/1990 | Melkrantz |
| 4,963,272 A | 10/1990 | Garrett |
| 5,037,558 A | 8/1991 | Kalnins |
| 5,045,046 A | 9/1991 | Bond |
| 5,062,955 A | 11/1991 | Sciamanna |
| 5,068,035 A | 11/1991 | Mohr |
| 5,114,568 A | 5/1992 | Brinsmead et al. |
| 5,116,488 A | 5/1992 | Torregrossa |
| 5,133,861 A | 7/1992 | Grieve |
| 5,149,432 A | 9/1992 | Lavin |
| 5,156,745 A | 10/1992 | Cairo, Jr. et al. |
| 5,180,493 A | 1/1993 | Grieve |
| 5,200,083 A | 4/1993 | Kaylor |
| RE34,321 E | 7/1993 | Campbell |
| 5,230,797 A | 7/1993 | Knelson |
| 5,246,592 A | 9/1993 | Schweizer et al. |
| 5,279,637 A | 1/1994 | Lynam et al. |
| 5,354,256 A | 10/1994 | Knelson |
| 5,387,342 A | 2/1995 | Rogers et al. |
| 5,464,536 A | 11/1995 | Rogers |
| 5,466,385 A | 11/1995 | Rogers et al. |
| 5,582,724 A | 12/1996 | Rogers et al. |
| 5,853,266 A | 12/1998 | Parkinson et al. |

FOREIGN PATENT DOCUMENTS

| | | |
|---|---|---|
| DE | 723 672 | 8/1942 |
| DE | 1 113 184 | 8/1961 |
| DE | 1 432 891 | 9/1969 |
| DE | 23 36 564 | 4/1975 |
| DE | 32 03 185 A1 | 8/1983 |
| DE | 34 08 789 A1 | 9/1985 |
| FR | 672.184 | 12/1929 |
| FR | 826.502 | 4/1938 |
| GB | 260071 | 8/1926 |
| GB | 2 226 271 A | 6/1990 |
| PL | 66 414 | 5/1967 |
| PL | 129 042 | 12/1985 |
| RU | 957929 | 2/1981 |
| WO | WO 93/11877 | 6/1993 |

* cited by examiner

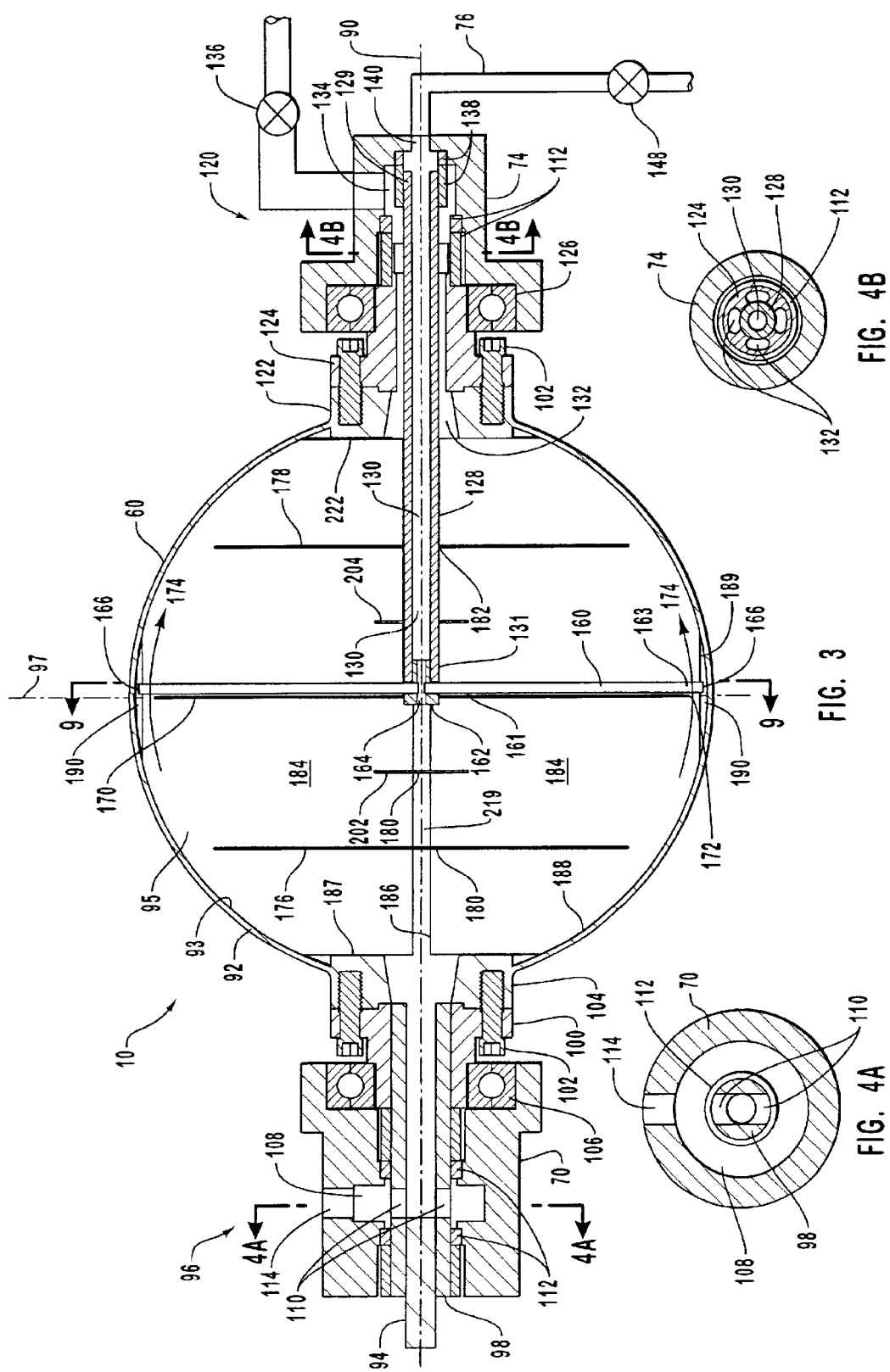

METHODS FOR CENTRIFUGALLY SEPARATING MIXED COMPONENTS OF A FLUID STREAM

CROSS REFERENCE TO RELATED APPLICATIONS

This application is a continuation-in-part of U.S. patent application Ser. No. 09/441,598, entitled CENTRIFUGAL PRESSURIZED SEPAMTORS AND METHODS OF CONTROLLING SAME, filed Nov. 17, 1999, now U.S. Pat. No. 6,346,069 which claims priority to provisional Application Serial No. 60/147,669, filed Aug. 6, 1999.

BACKGROUND OF THE INVENTION

1. The Field of the Invention

The present invention relates to methods for centrifugally separating components of fluids having different density.

2. The Relevant Technology

Water purification is an age-old activity that has been pursued to achieve both potable water and water for industrial use. With the rise of industrialization, water purification took on a new importance because industrial water usage generally involved discharging contaminated water into the environment. As concerns about the environment have increased, water discharged into the environment has been subjected to increasingly higher standards. Thus, increased efforts have been undertaken to identify methods of processing water to substantially reduce both dissolved and particulate pollutants.

One aspect of water purification that is particularly time consuming and/or equipment intensive is liquid-solid separation. Traditionally, settling ponds, or thickeners, have been used in which a large volume of particulate-containing water is allowed to reside in a quiescent state. With the force of gravity acting on the mixture, the particulate, even those in the Stokes flow regime, will separate from the liquid.

One disadvantage to the use of thickeners is that they have to be extremely large to have any significant flow capacity. Thus, their use is not practical in crowded urban areas where the need for such water purification systems is often the greatest. Consequently, thickeners have been developed that allow for a continuous flow of particulate-containing liquid into the center of the thickener, producing a clarified supernatant liquid and a compacted sludge. The compacted sludge, exiting from the bottom of the thickener, typically has a water content that amounts to between 10 and 30 percent of total water being fed to the thickener.

Traditional thickeners have been improved in the last decade or so with the advent of the high-rate thickener. The high-rate thickener has a center feed well that extends below the mud line of the underflow material. Accordingly, all water entering the thickener must pass through the sludge which acts as a filter medium. By using the sludge as a filter, solid-liquid separation rates are increased, albeit only incrementally over that of traditional thickeners. Additionally, high-rate thickeners also must be very large and, consequently, also have large footprints, rendering their use impractical in many situations.

Another aspect of separation includes liquid-liquid systems such as separating the oil and water from a sump in a machine shop or in a washing bay for trains or buses etc. Other liquid-liquid separation systems are utilized in the food industry where oil and water need separation. One of the problems in the prior art is the effect of load disturbances such as a surge of oil or water in a cleaning operation that upsets the balance of the oil/water feed ratio to the separator. Although the separator may be controlled to prevent one component from entering the wrong exit stream, a catastrophic surge of one component or the other cannot be controlled.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

FIG. 3 is a cross-sectional view of one embodiment of the solid-liquid separator shown in FIG. 2;

FIGS. 4A–B are cross-sectional views taken along line 4A—4A and 4B—4B of FIG. 3, respectively;

DETAILED DESCRIPTION OF THE PREFERRED EMBODIMENTS

The present invention relates to systems and corresponding apparatus for clarifying and/or separating components of a fluid stream. For example, in one embodiment, the system can be used for clarifying water or other liquids that have been contaminated with particulate matter, including organic and inorganic contaminants. The system can also be used for separating immiscible liquids such as an oil/water mixture or separating liquids of different density. Reference is now made to the drawings wherein like reference numbers refer to like unit operations or structures. The drawings are understood to be diagrammatic and/or schematic and are not necessarily drawn to scale nor are they to be limiting of the spirit and scope of the present invention.

Figure 1:
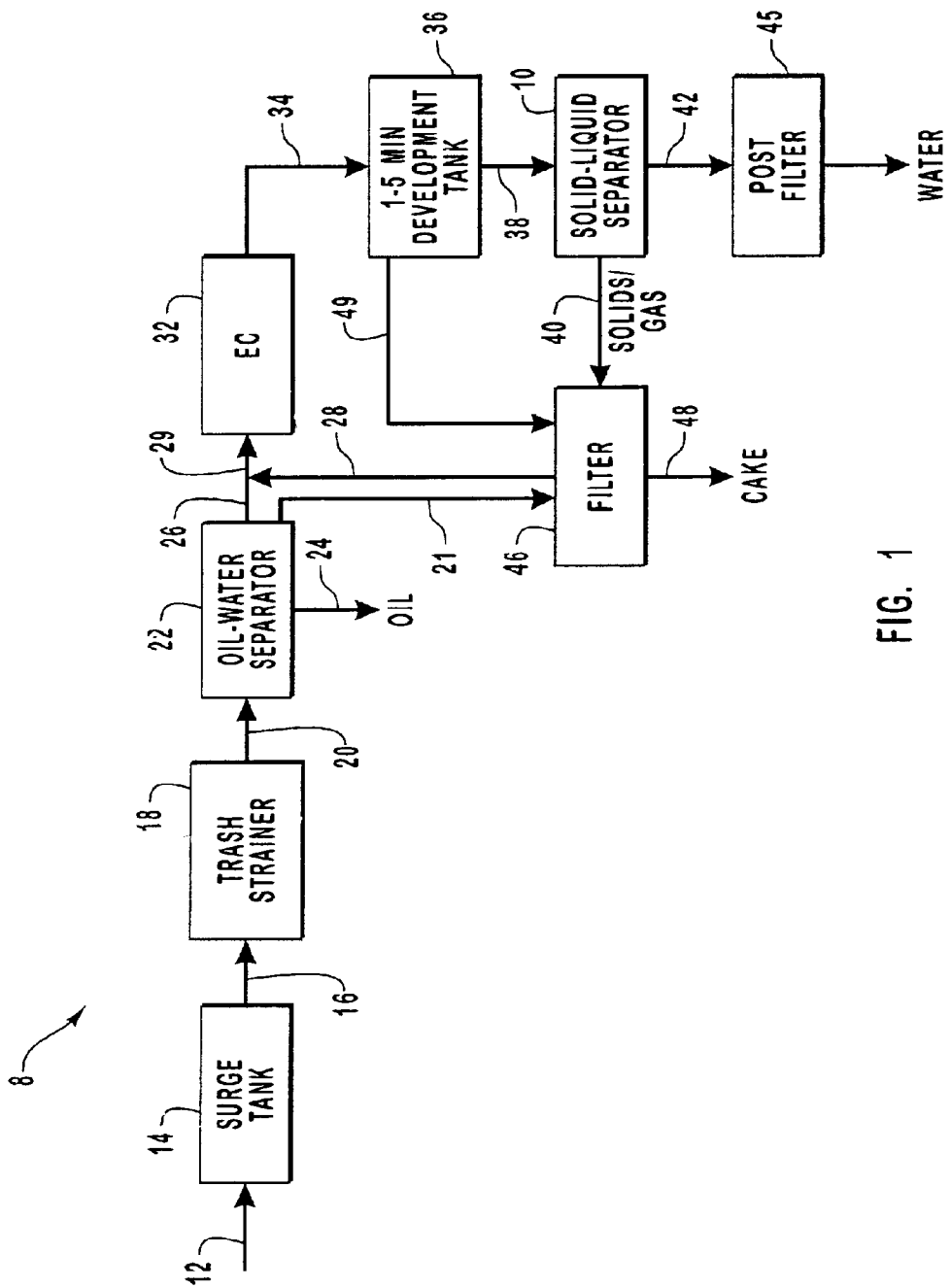
FIG. 1 is a block diagram overview of a process that uses one or more of the separators of the present invention.

FIG. 1 is a block diagram overview of one embodiment of a system 8 that uses an inventive separator as a solid-liquid separator 10 and/or an oil-water separator 22. As illustrated in FIG. 1, separators 10 and 22 are connected with a variety of other processing components. System 8 is configured for treatment of a fluid feed stream 12 that contains water, oil, and particulate. It is appreciated that depending on the content of feed stream 12 and the desired end components, select components of depicted system 8 can be removed, exchanged for other apparatus, or that additional components can be added.

Feed stream 12 may consist of a variety of different compositions, such as water which includes pollutants like oil, bacterial contaminants, dissolved metals and minerals, and colloidally suspended solids. Feed stream 12 may originate, by way of example and not by limitation, from industrial facilities, animal product processing facilities, sewage treatment, municipal water treatment, the petroleum industry, and any other type of facility or system that has a fluid product or waste that needs to be clarified and/or separated.

Feed stream 12 is initially feed to surge tank 14 which acts as a holding tank to store a large inflow of fluid. Surge tank 14 may include any commercially available surge tank, an earthen pond, or other liquid holding vessel. In other embodiments, surge tank 14 is not required and can be eliminated from the system. From surge tank 14, the fluid follows a flow path 16 to a trash strainer 18 for removing trash and oversized particles which could clog the system. Exiting from trash strainer 18, the fluid follows flow path 20 into oil-water separator 22 that divides an oil stream 24 from a water stream 26. As will be discussed below in greater detail, oil-water separator 22 can also be periodically flushed to clean out particulate matter collected within separator 22. The particulate matter is flushed out through a solids line 21 to a filter 46 discussed below.

While a variety of oil-water separators may be employed, in one embodiment oil-water separator 22, as will be discussed below in greater detail, is comprised of a separator having many of the same inventive features as will be discussed with regard to solid-liquid separator 10. Alternatively, oil-water separator 22 can comprise an oil-water separator such as those separators disclosed in U.S. Pat. Nos. 5,387,342, 5,582,724 and 5,464,536.

Water stream 26 may be combined with a filter water stream 28 so as to form a feed stream 29 that is feed to an electrostatic coagulator 32. Electrostatic coagulator 32 operates to electrically sterilize the water by killing any living organisms, breaking down colloidal suspensions of impurities, and coalescing impurities into a flocculent. Such systems are available from Scott Powell Water Systems, Inc. of Denver, Colo.

A coagulated effluent stream 34 supplies a development tank 36 that typically has a residence time of from about one to five minutes or longer. While in development tank 36, the particle size of the flocculent grows. Effluent stream 38 from development tank 36 supplies solid-liquid separator 10 which will be discussed below in greater detail. Solid-liquid separator 10 generates an particulate stream 40 constituting the particulate matter and gas that has been removed from the effluent stream 38, and an clarified stream 42 constituting the clarified water or other liquid. The clarified water in clarified stream 42 is discharged either directly or through a post filter 45 to the environment or other designed destination. Particulate stream 40 is supplied to filter 46 from which filter water stream 28 and a filter cake 48 are generated.

In one embodiment, gas and residual oil collected in the top of development tank 36 can be directly drawn off through line 49 to filter 46. It is also appreciated that oil-water separator 22, electrostatic coagulator 32, development tank 36, solid-liquid separator 10, and filter 46 can each be operated under an elevated pressure, such as by the application of a pump, so as to facilitate desired flows through the system. The pressure may vary in one or more of the components 22, 32, 36, 10 and 46 so as to control flow in desired directions.

Figure 2:
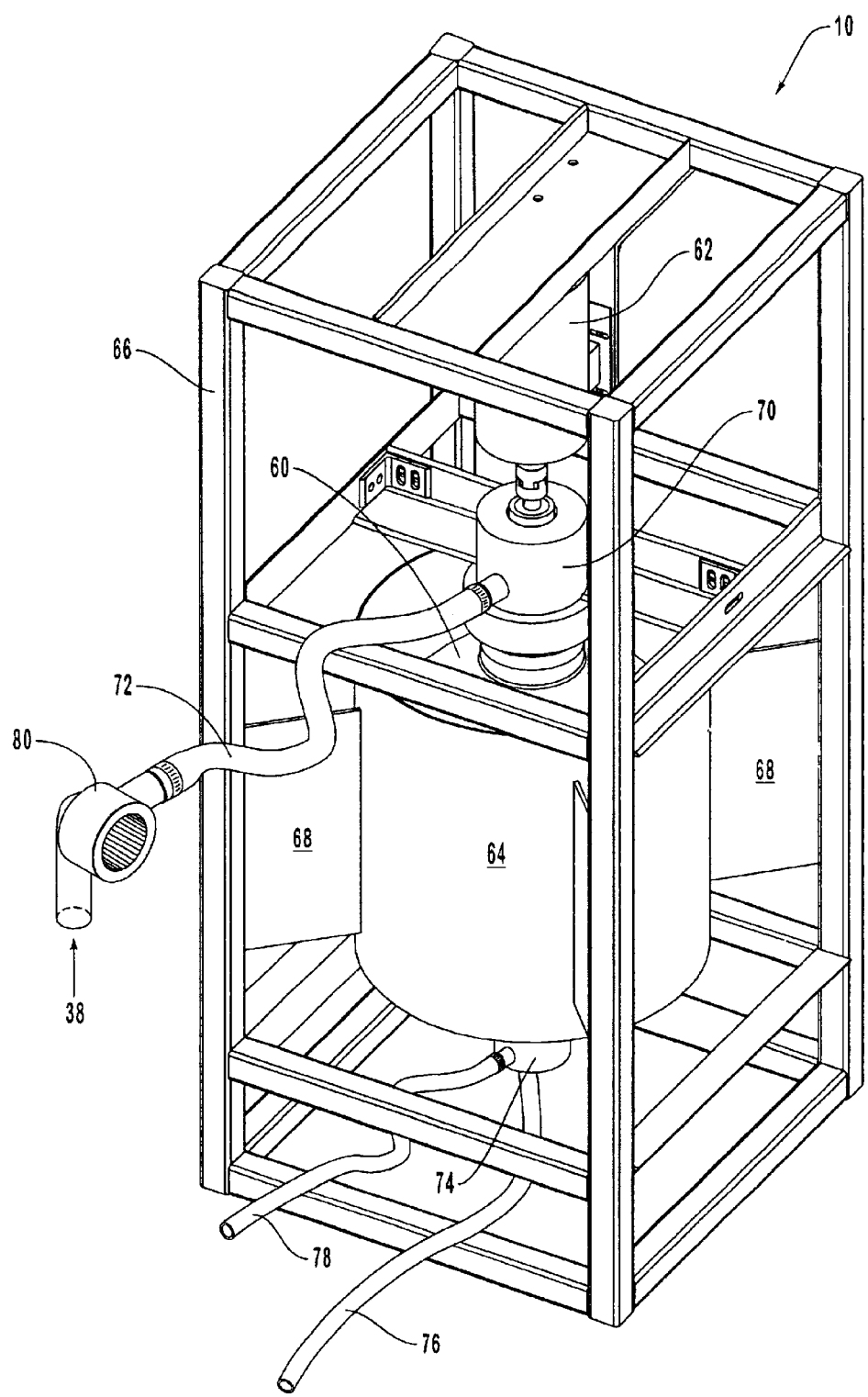
FIG. 2 is a perspective view of one embodiment of a solid-liquid separator of the present invention.

Depicted in FIG. 2 is one embodiment of solid-liquid separator 10 incorporating features of the present invention. Solid-liquid separator 10 includes a pressure vessel 60 which is driven by a motor 62. Although solid-liquid separator 10 of the present invention can be manufactured in a variety of different sizes, the depicted embodiment is designed to process approximately 40 liters/minute. In such an embodiment, a 2.5 horsepower, 3440 RPM electric motor can be utilized.

Pressure vessel 60 is preferably mounted within a guard 64. Guard 64 merely provides a shroud or housing as a safety mechanism to keep people and objects away from spinning pressure vessel 60. In the illustrated embodiment, a frame assembly 66 is provided to which guard 64 is mounted via mounting fins 68. One of skill in the art will, of course, appreciate that guard 64 may be configured and attached to frame assembly 66 in a variety of ways.

Frame assembly 66 is further configured to provide support to the motor 62 and the bearing structure which supports pressure vessel 60. Solid-liquid separator 10 includes a stationary inlet housing 70 configured to receive an inlet line 72. Similarly, a stationary outlet housing 74 is provided on the opposite end of the pressure vessel 60 to which is attached an outlet removal line 76 and an outlet effluent line 78.

A pump 80 is used to receive and feed effluent stream 38 to solid-liquid separator 10 through inlet line 72. Pump 80 pressurizes effluent stream 38 in inlet line 72 such that solid-liquid separator 10 operates under such pressure. Hence, pump 80 must be capable of pumping effluent stream 38 at the flow rate capacity of the solid-liquid separator 10 while maintaining a desired pressure. In one embodiment, pump 80 maintains effluent stream 38 at a pressure in a range between about 1 psi ($6.89 \times 10^3$ Pa) to about 600 psi ($4.14 \times 10^6$ Pa) with about 30 psi ($2.07 \times 10^5$ Pa) to about 125 psi ($8.61 \times 10^5$ Pa) being more preferred. Pump 80 also produces flow rates in a range between about 3 liters/minute to about 1,000 liters/minute. Any commercially available pump which can create the above pressures and the desired flow rates will function for the desired purpose. Depending on the intended use, it is appreciated that the pressure range and flow rate can also be larger or smaller.

As illustrated in FIG. 3, pressure vessel 60 is mounted for rotation about rotational axis 90 which also coincides with the rotational axis of solid-liquid separator 10. Pressure vessel 60 includes a peripheral wall 92 having an interior surface 93 bounding a chamber 95. In the embodiment depicted, chamber 95 is in the shape of a sphere, although other configurations may be utilized. Because vessel 60 is mounted for rotation about axis 90, pressure vessel 60 will generally include a geometry comprising a body of rotation about axis 90.

Additionally, it is desirable, although not required, that the walls of pressure vessel 60 slope radially outward towards an equator 97 having a maximum diameter that encircles rotational axis 90. Thus, although a pressure vessel with spherical walls 92 is one desired embodiment because of its efficient pressure bearing qualities, other curved-wall vessels, such as those having an oval, elliptical, or symmetrically irregular shape may be employed. Furthermore, straight-line configurations such as two truncated cones with their wide ends affixed together can be used. Similarly, a vessel having a cylindrical configuration at the edges and a center which is formed by truncated cones connected together can be used. In yet other embodiments, vessel 60 need not have outwardly sloping walls. For example, vessel 60 can be cylindrical or have a polygonal transverse cross section.

Pressure vessel 60 may be made out of a variety of materials including stainless steel, plastics, composites, filament wound structures, and other conventional materials. In one embodiment, pressure vessel 60 is capable of withstanding pressures in a range between about 1 psi ($6.89 \times 10^3$ Pa) to about 2,000 psi ($1.38 \times 10^7$ Pa) with about 100 psi ($6.89 \times 10^5$ Pa) to about 1,000 psi ($6.89 \times 10^6$ Pa) being more preferred. In the embodiment depicted, pressure vessel 60 is made out of stainless steel and has two halves for ease of manufacture and construction. The two halves are secured together such as by welding, bolts, or other conventional methods such that a seam is formed at equator 97 of vessel 60.

As illustrated in FIG. 3, solid-liquid separator 10 includes a drive shaft 94 at its inlet end 96 which is rigidly mounted to vessel 60. Drive shaft 94 is configured to engage motor 62 (FIG. 2) as is known in the art. Drive shaft 94 is mounted within a hollow shaft 98 which is secured within inlet mounting collar 100. Inlet mounting collar 100, in turn, is secured to vessel 60 within a plurality of mounting bolts 102, in a manner known to one of skill in the art.

Drive shaft 94, hollow shaft 98, and inlet mounting collar 100 are thus all rigidly secured to each other and to vessel 60 by any of those methods known in the art, such as by welding or the use of bolts, such as mounting bolts 102 which engage an inlet mounting flange 104. These components comprise a drive assembly which is rigidly affixed to vessel 60 and, consequently, rotates with vessel 60.

The drive assembly is configured to engage inlet housing 70. Inlet housing 70 supports the drive assembly with an inlet bearing assembly 106 which, in this embodiment, engages the inlet mounting collar 100. Inlet bearing assembly 106 is a sealed ball bearing assembly resting in a pillow such as will be well known to one of skill in the art.

Inlet housing 70 is configured with a feed stream inlet 114 which is configured for receiving inlet line 72 (FIG. 2) via any of those known attachment methods known in the art for providing fluid communication. As illustrated with reference to FIGS. 3 and 4A, inlet housing 70 is further configured with an annular manifold cavity 108 which surrounds hollow shaft 98. Hollow shaft 98 includes a plurality of access ports 110. Mechanical pump seals 112 are provided between hollow shaft 98 and inlet housing 70 on each side of manifold cavity 108, thereby providing a fluid seal while allowing relative rotational movement between inlet stationary housing 70 and hollow shaft 98. Mechanical pump seals such as are available from A.W. Chesterton Co. of Stoneham, Mass. function for the desired purpose.

With continued reference to FIG. 3, the support structure for vessel 60 at outlet end 120 is illustrated and described. As at inlet end 96, vessel 60 at outlet end 120 is similarly configured with an outlet mounting flange 122. An outlet mounting collar 124 is attached to outlet mounting flange 122 with a number of bolts 102. Outlet mounting collar 124 is supported on outlet housing 74 via an outlet bearing assembly 126.

Outlet housing 74 and outlet mounting collar 124 are each configured with a hollow interior for receiving an exit tube 128 having a removal channel 130 therein. As illustrated in FIG. 4B, the hollow interior of outlet housing 74 and outlet mounting collar 124 is configured relative to exit tube 128 such that an annular effluent channel 132 is defined therebetween. Effluent channel 132 extends exterior of exit tube 128 and is in fluid communication with an effluent outlet 134 configured in outlet housing 74. Referring again to FIG. 3, in one embodiment effluent outlet 134 includes a pressure relief valve 136 for maintaining pressure within vessel 60. Pressure relief valve 136 may be a one-way, spring-loaded fail shut valve in which the spring force must be overcome by a sufficient fluid pressure to force the valve open.

An outlet end 129 of exit tube 128 is overfit with mechanical pump seal 138. The opposing end of mechanical pump seal 138 is rigidly affixed within a circular step configured in the interior end of outlet housing 74. Thus, mechanical pump seal 138 acts as a fluid barrier between removal channel 130 and effluent channel 132 and allows for relative rotational movement between exit tube 128 and outlet housing 74. The outlet end of outlet housing 74 is further configured with an exit orifice 140 which engages outlet removal line 76. Outlet removal line 76 is accessed through an exit valve 148 which may be a standard or solenoid valve, such as a ball valve that is commercially available.

Exit tube 128 also has an inlet end 131. In one embodiment, a plug 162 is received within the opening at inlet end 131. A gas escape orifice 164 extends through plug 162 so as to establish fluid communication between the center of chamber 95 and channel 130 extending through exit tube 128. Gas escape orifice 164 typically has a diameter in a range between about 0.02 inches (0.05 cm) to about 0.5 inches (1.3 cm) with about 0.02 inches (0.05 cm) to about 0.125 inches (0.3 cm) being more preferred. Depending on the intended use, this dimension can also be larger or smaller. In an alternative embodiment, inlet end 131 can simply be formed with a constricted orifice that communicates with removal channel 130, thereby precluding the need for plug 162.

With continued reference to FIG. 3, exit tube 128 extends to the center of vessel 60. Solid-liquid separator 10 also includes a plurality of radially outwardly extending extraction tubes 160. Each extraction tube 160 has a first end 161 and an opposing second end 163. Each first end 161 is in fluid communication with exit tube 128 at inlet end 131 thereof. Extending through each extraction tube 160 is a channel having a diameter in a range from about 0.06 inches (0.15 cm) to about 2.0 inches (5 cm) with about 0.125 inches (0.3 cm) to about 0.5 inches (1.3 cm) being more preferred. In other embodiments the diameter can be smaller or larger. In one embodiment, eight extraction tubes 160 are employed, each spaced 45 degrees from the adjacent tube. In alternative embodiments, any number of extraction tubes 160 can be used. In one embodiment, a typical number of extraction tubes 160 ranges from about 2 to about 144 with about 4 to about 24 being more preferred.

In yet another embodiment, extraction tubes 160 need not radially outwardly project from exit tube 128 such that extraction tubes 160 are perpendicular to exit tube 128. Rather, extraction tubes 160 can outwardly project from exit tube 128 at an angled orientation. For example, in one embodiment, the inside angle between each extraction tube 160 and exit tube 128 may be in a range between about 90° to about 160°. In the embodiments where the inside angle is greater than 90°, exit tube 128 can be shorter so that inlet end 131 of exit tube 128 couples with first end 161 of each extraction tube 160. In yet other embodiments, the inside angle between each extraction tube 160 and exit tube 128 can be less than 90°.

Extraction tubes 160 each extend outwardly an equal distance from the rotational axis 90 of solid-liquid separator 10. Each extraction tube 160 has an opening 166 at its second end 163 for receiving separated particulate matter and fluid. In operation, extraction tubes 160, as further explained below, assist in defining a boundary line between the collected particulate matter and the clarified liquid. Thus, the length of extraction tubes 160 is set to provide a predetermined boundary line within vessel 60. In one embodiment in which vessel 60 has a maximum inner diameter of 19 inches at equator 97, extraction tubes 160 are configured to leave a 0.25 inch (0.65 cm) space between opening 166 in tubes 160 and wall 92 of vessel 60. In alternative embodiments, including those of different sized vessels, the space between the opening 166 in extraction tubes 160 and wall 92 of vessel 60 is typically in a range between about 0.125 inches (0.3 cm) to about 2 inches (5 cm) with about 0.25 inches (0.6 cm) to about 1 inch (2.5 cm) being more preferred. In other embodiments, the space can be smaller or larger.

Vessel 60 is also configured with a plurality of fins and discs for channeling fluid flow through vessel 60. One embodiment of solid-liquid separator 10 includes a center disc 170, positioned in the center of vessel 60 and oriented perpendicular to rotational axis 90, as illustrated in FIG. 3. Center disc 170 is configured with a central orifice which fits over plug 162. Center disc 170 extends in a circular configuration radially outward from plug 162. Outer edge 172 of disc 170 is circular (following the curvature of vessel 60) and is configured to provide an axial flow passage 174 between the edge 172 of disc 170 and wall 92 of vessel 60. Flow passage 174 extends annularly about axis 90. Outer edge 172 is typically, although not necessarily, disposed radially inward from opening 166 of extraction tubes 160. In one embodiment, the distance between edge 172 of disc 170 and wall 92 of vessel 60 is in a range between about 0.5 inches (1.3 cm) to about 4 inches (10 cm) with about 0.8 inches (2 cm) to about 1.2 inches (3 cm) being more preferred. In other embodiments, this distance can also be larger or smaller.

The depicted embodiment also includes four additional discs 176, 178, 202 and 204. Discs 176 and 202 are positioned on the inlet side of vessel 60 with discs 178 and 204 positioned on the outlet side. Discs 176, 178, 202 and 204 are used in part to facilitate assembly of the solid-liquid separator 10 and to provide structural support during operation thereof. Alternatively, the solid-liquid separator 10 can be assembled with fewer or greater numbers of assembly discs. It is also envisioned that the inventive solid-liquid separator 10 can be constructed without discs by securing the fins, as discussed below, directly to exit tube 128 and/or wall 92 of vessel 60.

Figure 5:
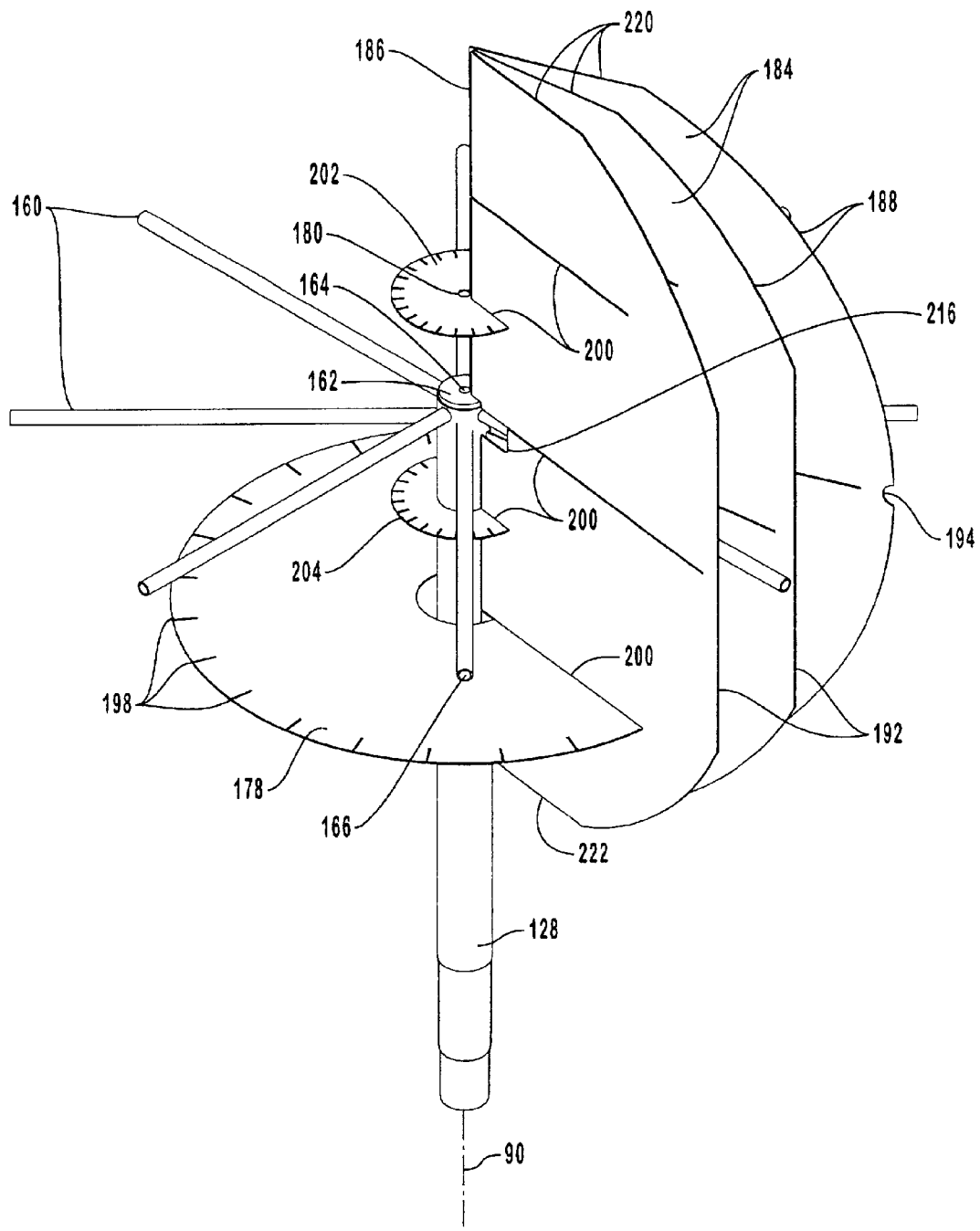
FIG. 5 is a perspective view of a partial assembly of the interior of the vessel of the solid-liquid separator shown in FIG. 3, revealing a portion of the fin and disc assembly.
Figure 6:
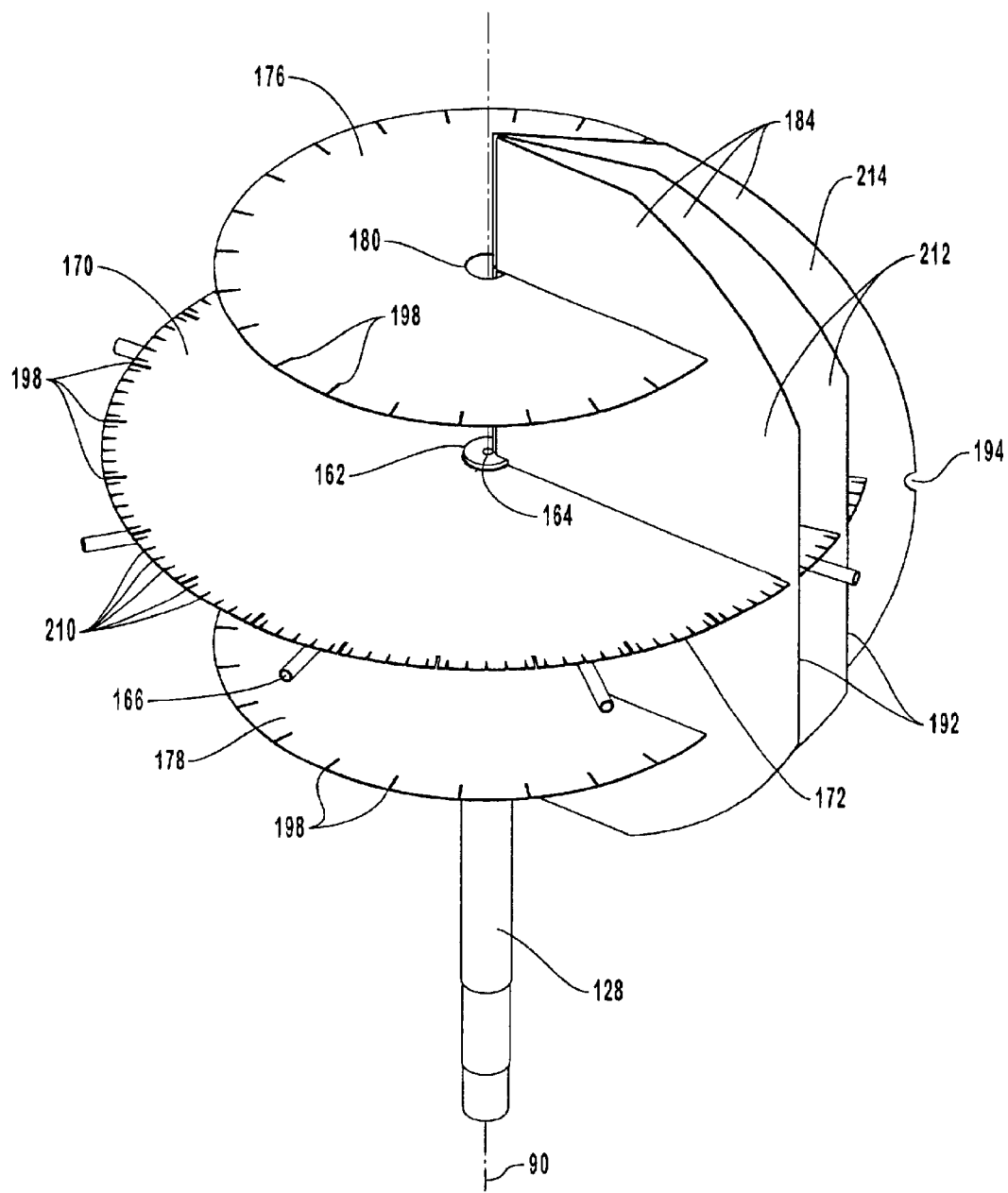
FIG. 6 is a perspective view of a partial assembly of the interior of the vessel of the solid-liquid separator illustrated in FIG. 3, revealing a more complete portion of the fin and disc assembly.

As illustrated in FIGS. 5 and 6, discs 176 and 202 include central orifices 180 which allow gas that collects at the center of the vessel 60 to be extracted. Discs 178 and 204 are similarly configured with central orifices 182 slightly larger than the outside diameter of exit tube 128, thereby accommodating passage therethrough of exit tube 128. V-notches 210 may be formed, such as by being laser cut, into outer edge 172 of disc 170. These v-notches minimize the disturbance of the collected particulate matter as the clarified water flows around disc 170. In one embodiment, these v-notches 210 are cut at the edge 172 of disc 170 having a width in a range between about 0.1 inch (0.25 cm) to about 1 inch (2.5 cm) and a depth in a range between about 0.1 inch (0.25 cm) to about 1 inch (2.5 cm). The number of v-notches 210 that are cut into center disc 170 between each pair of fins 184 is typically in a range between about three notches to about eight notches. Alternatively, the number and size of these v-notches 210 can be increased or reduced.

Referring now to FIG. 5, solid-liquid separator 10 also includes a plurality of radial fins 184. Each fin 184 has an inside edge 186 which is generally parallel to rotational axis 90 and an outside edge 188 which generally follows the curvature of vessel 60. Thus, in the configuration illustrated herein, in which spherical vessel 60 is employed, outside edge 188 of fins 184 has a substantially semi-circular configuration.

Figure 7A:
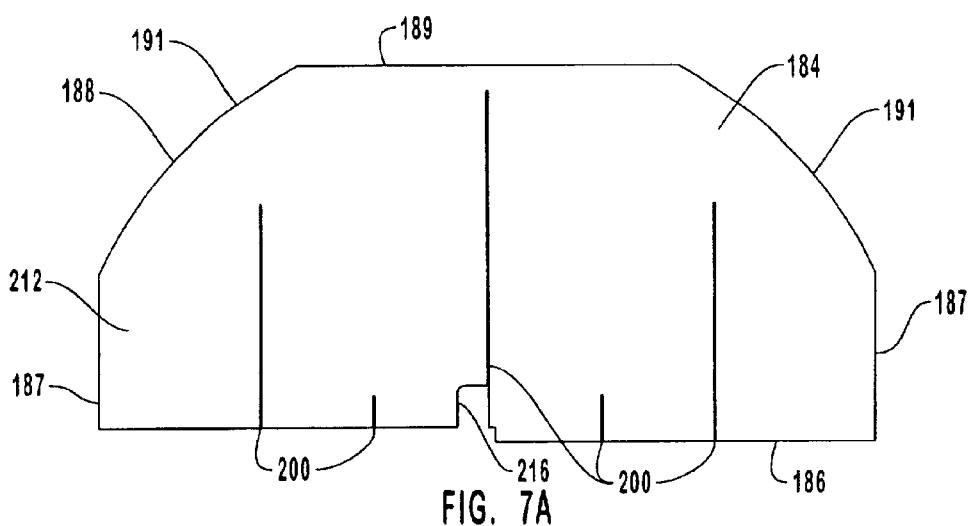
FIGS. 7A, B and C are alternative fin embodiments which may be utilized in the separators of the present invention.
Figure 8:
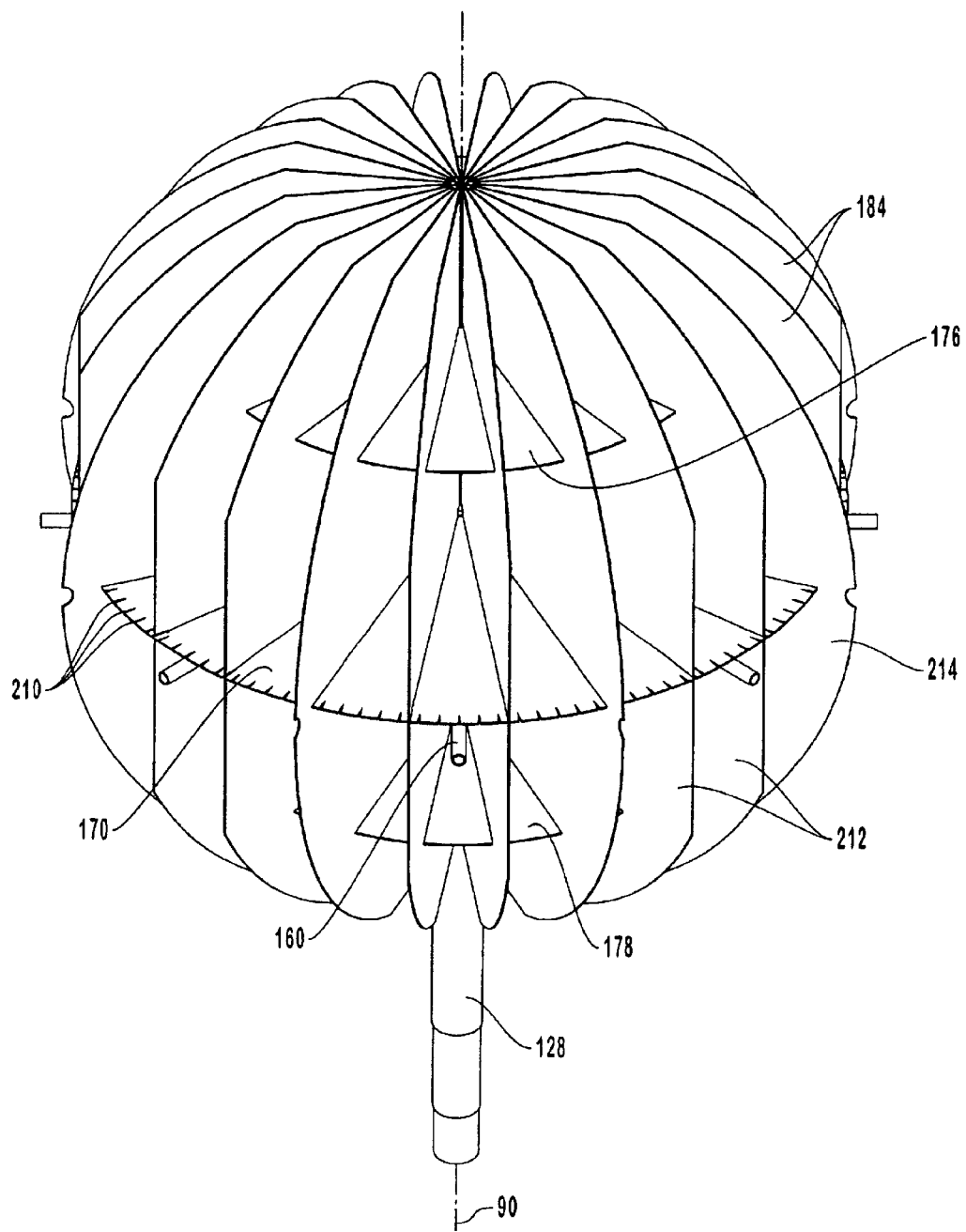
FIG. 8 is a perspective view of a partial assembly of the interior of the vessel of the solid-liquid separator illustrated in FIG. 3, revealing a completed fin and disc assembly.

In the embodiment illustrated in FIG. 8, two types of fins 184 are used: trimmed fins 212 and untrimmed fins 214. As depicted in FIG. 7A, each trimmed fin 212 includes a substantially flat inside edge 186 and an opposing outside edge 188. Outside edge 188 includes a substantially flat side portion 187 orthogonally projecting from each end of inside edge 186, a centrally disposed substantially flat nose portion 189 disposed substantially parallel to inside edge 186, and a curved shoulder portion 191 extending from each side portion 187 to opposing ends of nose portion 189.

Figure 7B:
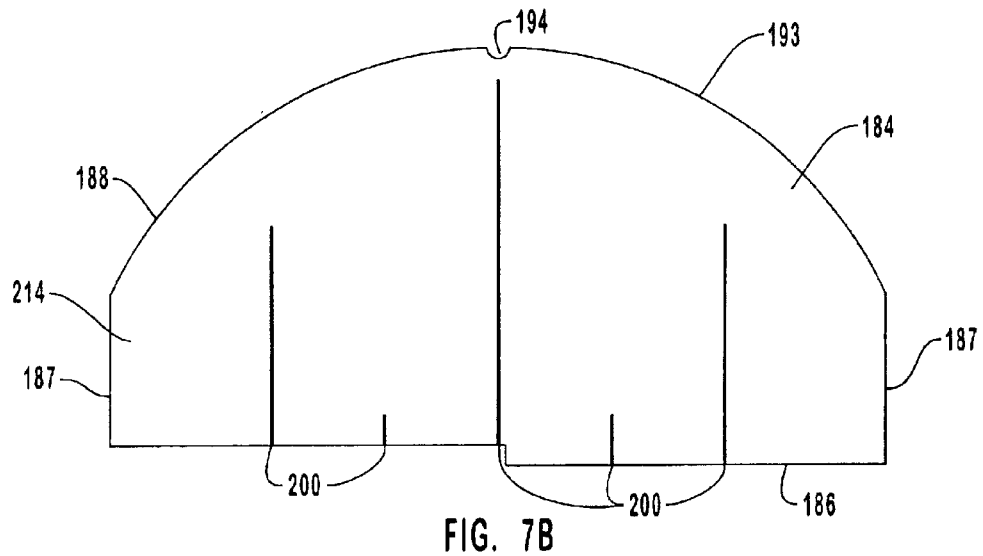

As illustrated in FIG. 7B, each untrimmed fin 214 includes a substantially flat inside edge 186 and an opposing outside edge 188. Outside edge 188 includes a substantially flat side portion 187 orthogonally projecting from each end of inside edge 186 and a curved face portion 193 extending between each side portion 187. A centrally disposed semicircular notch 194 is formed on face portion 193.

Figure 7C:
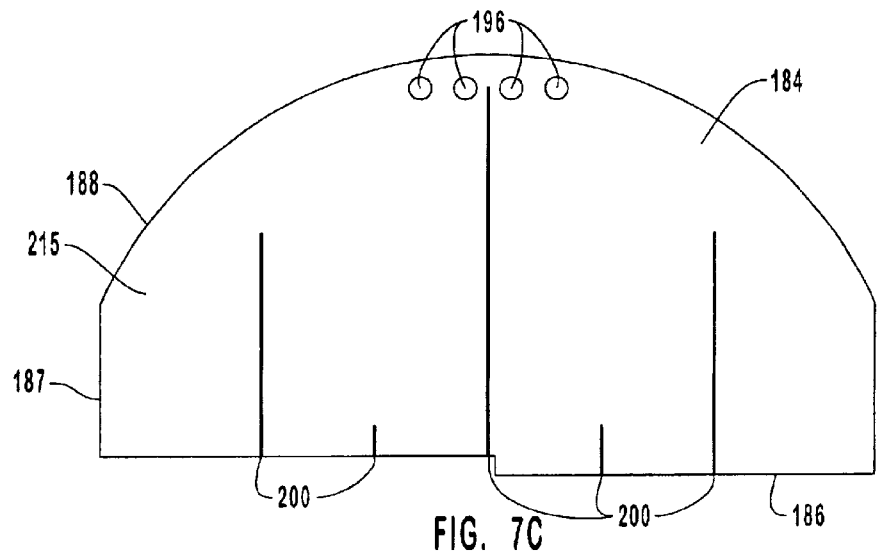

An alternative fin 215 is illustrated in FIG. 7C. Fin 215 has substantially the same configuration as untrimmed fin 214 except that notch 194 is replaced with holes 196 extending through fin 215. Such holes 196 typically have a diameter in a range between about 0.5 inches (1.3 cm) to about 1.5 inches (3.8 cm).

Fins 184 are positioned within chamber 95 of vessel 60 perpendicularly to discs 170, 176, 178, 202 and 204 as best illustrated in FIGS. 5 and 6. Each disc is provided with a slot 198 which corresponds to each fin 184. Slots 200, which correspond to each disc 170, 176, 178, 202 and 204, are also configured in each fin 184. Fins 184 and discs 170, 176, 178, 202 and 204 are in one embodiment formed of stainless steel but can also be formed from plastics, composites, and other sufficiently strong material. Slots 198 and 200 may be formed using any conventional method such as by laser cutting. Slots 198 and 200 are configured to allow the fins and discs to engage each other in a slip fit, mating relationship. Thus, slots 198 configured in discs 170, 176, 178, 202 and 204 have a width at least as great as the thickness of fins 184. Similarly, slots 200 configured in fins 184, have a width at least as great as the thickness of the discs 170, 176, 178, 202 and 204 which correspond to these slots.

The fin and disc assembly within vessel 60 is thus assembled as illustrated in FIG. 5 by positioning outlet discs 204 and 178 over exit tube 128. Center disc 170 as seen in FIG. 6 is then placed about plug 162 and some fins 184 are engaged into their corresponding slots on the discs 170 and 178 while simultaneously engaging the discs with the corresponding slots on fins 184. When fin 184 is thus placed into mating engagement with a disc, virtually all relative movement between the disc and the fin is prohibited. Inlet discs 176 and 202 are then placed into mating engagement with slots 200 on fins 184. With all five discs 170, 176, 178, 202 and 204 now in position, the remaining fins are installed by sliding them radially into position, until the interior configuration of the vessel 60 is complete as illustrated in FIG. 8. Slots 198 and 200 are simply one way of securing the fins and discs together. In alternative embodiments, the fins and discs can be welded, clamped, integrally molded, or otherwise secured together using conventional methods.

Figure 9:
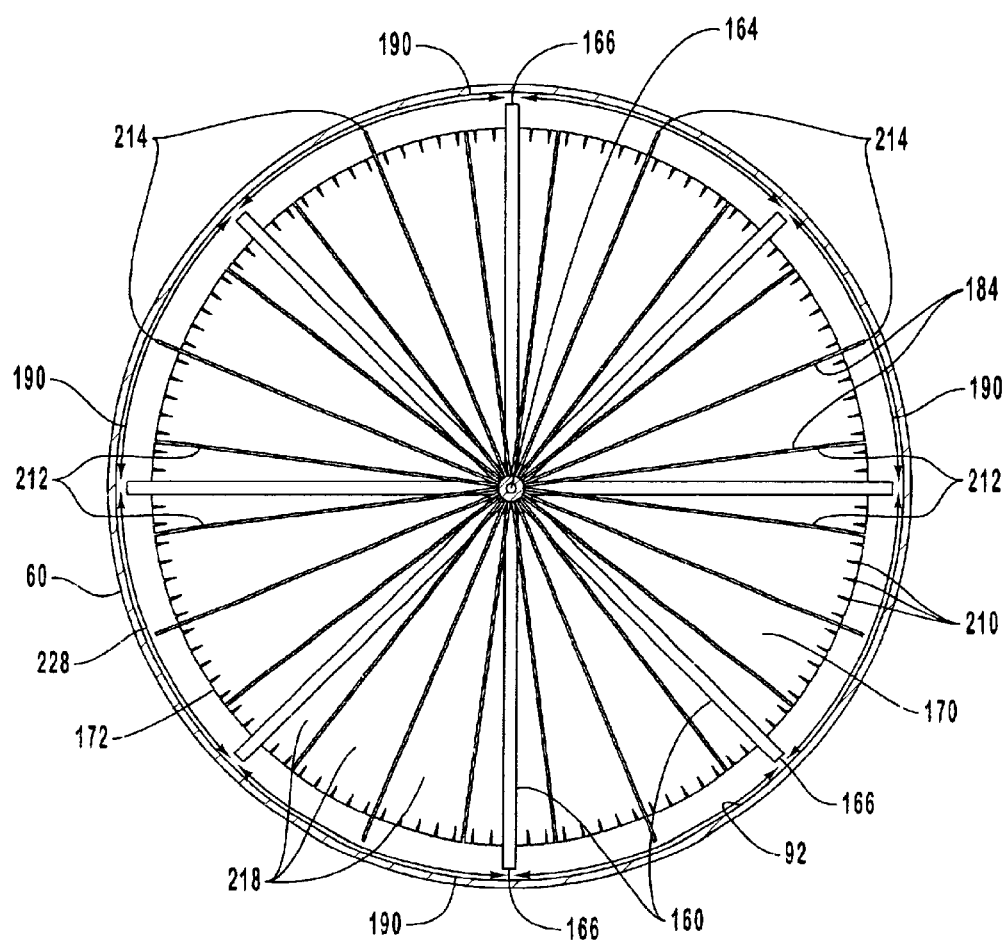
FIG. 9 is an elevational cross-sectional view taken along line 9—9 of FIG. 3.

In the depicted embodiment, twenty four fins 184 are utilized in vessel 60, as illustrated in FIGS. 8 and 9. In alternative embodiments, the number of fins 184 is typically in a range between about 8 to about 144 with about 12 to about 48 being more preferred. As best depicted in FIGS. 3, 8, and 9, the assembled fins 184 radially outwardly project from rotational axis 90 in substantially parallel alignment with rotational axis 90. Each inside edge 186 is spaced apart from the center of rotational axis 90 so that a channel 219, depicted in FIG. 3, is formed that extends from inlet end 96 to gas escape orifice 164. Channel 219 has a diameter typically in a range between about 0.25 inches (0.6 cm) to about 2 inches (5 cm) with about 0.25 inches (0.6 cm) to about 1 inch (2.5 cm) being more preferred. Depending on the intended use, the diameter can also be smaller or larger. As illustrated in FIGS. 7A and 7B the inside edge 186 of each fin 184 is cut to prevent interference with exit tube 128 and gas escape plug 162.

To accommodate the eight radial extraction tubes 160, trimmed fins 212 are modified with a central notch 216 as illustrated in FIG. 5. Notch 216 is sized to allow some degree of intersection of trimmed fins 212 with extraction tubes 160, as illustrated in FIG. 9. Hence, in the depicted embodiment, sixteen trimmed fins 212 as modified with a notch 216 are utilized in combination with eight untrimmed fins 214 which have not been so modified.

In an alternative embodiment, it is appreciated that fins 184 need not radially outwardly project in alignment with rotational axis 90. Rather, inside edge 186 of each fin 184 can be offset from alignment rotational axis 90 and still be retained in position by the discs. As used in the specification and appended claims, the phrase, "fin projecting from toward the rotational axis" is broadly intended to include embodiments where an inside edge of a fin is disposed in a plane that is either aligned with or offset from the rotational axis, where at least a portion of the inside edge is directly disposed along the rotational axis or is radially spaced outward from the rotational axis, and/or where the inside edge is parallel with or angled relative to the rotational axis.

With the fins and discs assembled about exit tube 128 as illustrated in FIG. the internal assembly is enclosed within chamber 95 of vessel 60. In one embodiment, vessel 60 is comprised of two halves which are secured together, such as by welding or bolting with a seal such as a gasket or o-ring disposed therebetween. By covering the internal assembly of FIG. 8 within wall 92 of vessel 60, the fins and discs become locked to each other in relative engagement and no welding is needed to hold them secure.

Figure 10:
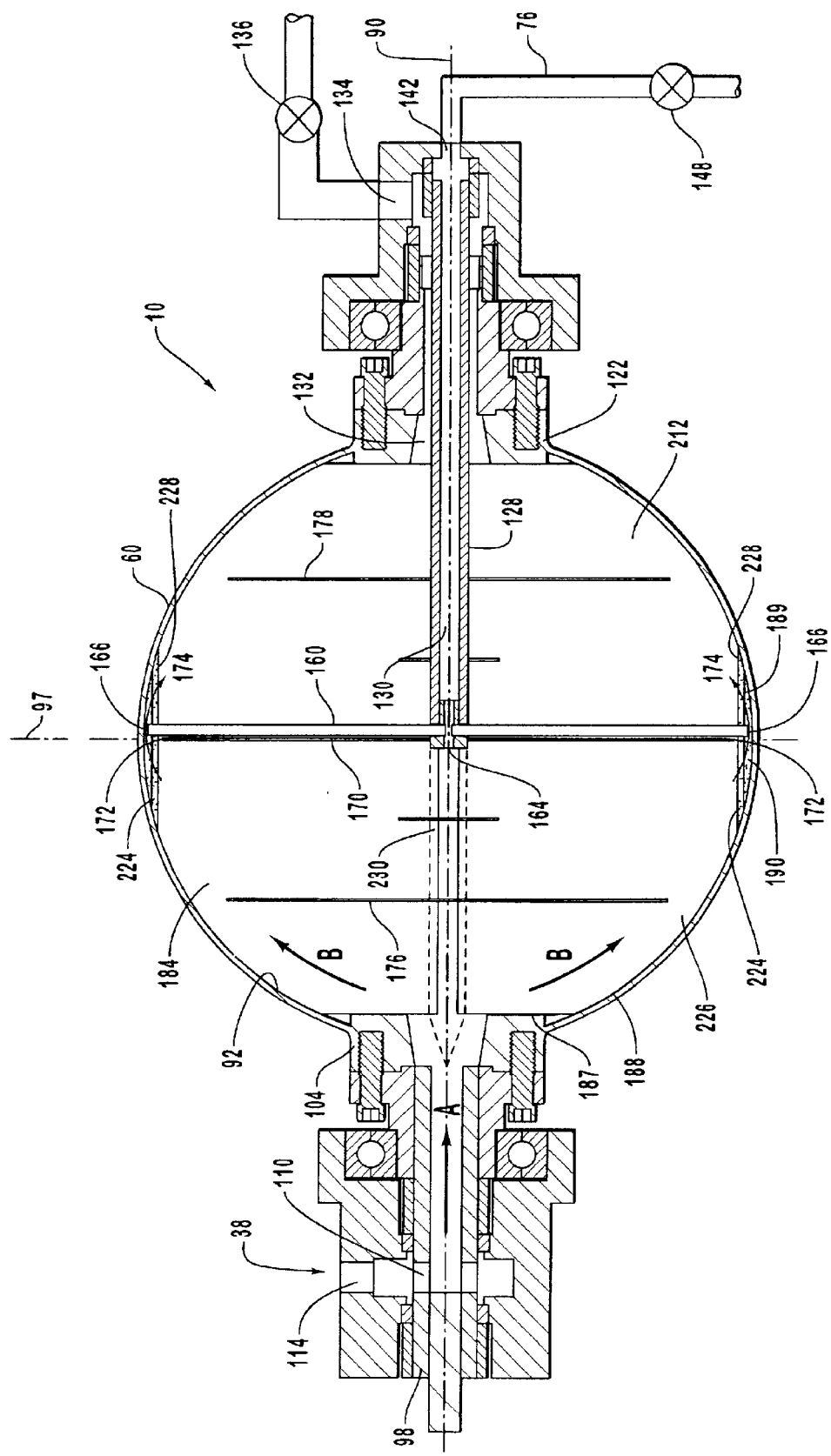
FIG. 10 is a cross-sectional view of the solid-liquid separator illustrated in FIG. 3 showing the solid-liquid separator in operation.

Specifically, as depicted in FIG. 10, flat side portions 187 of each fin 184 are disposed adjacent to mounting flanges 104 and 122. Curved shoulder portions 188 of trimmed fins 212 are disposed adjacent to wall 92. Similarly, curved face portion 193 of untrimmed fins 214 are also disposed adjacent to wall 92. Side portions 187, shoulder portions 188, and face portion 193 of fins 184 can be directly biased against vessel 60. Alternatively, a small gap, typically less than about ¼ inch, can be formed between vessel 60 and portions 187, 188, and 193. As illustrated in FIG. 9, the positioning of fins 184 adjacent to wall 92 results in the formation of a plurality of discrete flow channels 218 through vessel 60 along the rotational axis. Each flow channel 218, however, is partially blocked by the intersection of the various discs 170, 176, 178, 202, and 204. As a result of the discs, fluid traveling through flow channels 218 is required to flow around the outer edge of the discs.

Returning to FIG. 10, an underflow passage 190 is formed between flat nose portion 189 of trimmed fins 214 and wall 92. Underflow passage 190 enables fluid to flow between discrete flow channels 218 at equator 97. In one embodiment, the maximum gap between flat nose portion 189 of trimmed fin 214 and wall 92 is in a range between about 0.125 inches (0.3 cm) to about 2 inches (5 cm) with about 0.25 inches (0.6 cm) to about 1 inch (2.5 cm) being more preferred. In other embodiments, the maximum gap can be larger or smaller. Although not required, in one embodiment flat nose portion 189 of each fin 184 is positioned radially inward from opening 166 of each corresponding extraction tube 160.

It is of course envisioned that fins 184 can be formed in a variety of different configurations to facilitate underflow passage 190 between flow channels 218. For example, trimmed fins 212 can be replaced with alternative fins 215. In this embodiment, holes 196 facilitate underflow passage 190. In yet other embodiments, notches, slots, holes, grooves, and the like can be formed in a fin 184 to facilitate underflow passage 190.

Notch 194 (FIG. 7B) formed in untrimmed fins 214 is designed to perform two functions. First, in an embodiment where a seam is formed at equator 97, such as an inside flange, notch 194 provides space to receive the seam. Notch 194 also functions to allow at least some flow between flow channels 218 separated by untrimmed fins 214. Fluid flow through notch 194 thus helps to insure that boundary layers and flow rates are the same in each flow channel 218.

Once the internal assembly is enclosed within vessel 60, the inlet and outlet mounting collars 100, 124, the bearing assemblies, and housings assembled as described above are bolted or otherwise secured to vessel 60 using conventional methods known to those skill in the art.

In operation, as illustrated in FIG. 2, rotation of the vessel 60 is commenced by turning on motor 62. Motor 62 typically causes vessel 60 to rotate with a rotational velocity in a range between about 600 rotations/minute to about 10,000 rotations/minute with about 1,200 rotations/minute to about 3,600 rotations/minute being more preferred. A stream 38 is received by pump 80 which pumps stream 38 into the solid-liquid separator 10 through inlet line 72. Stream 38 is preferably pressurized by pump 80 such that a hydraulic pressure is maintained within vessel 60 during operation of the solid-liquid separator 10. In one embodiment vessel 60 of solid-liquid separator 10 operates under a hydraulic pressure in a range between about 1 psi ($6.89 \times 10^3$ Pa) to about 600 psi ($4.14 \times 10^6$ Pa) with about 30 psi ($2.07 \times 10^5$ Pa) to about 125 psi ($8.61 \times 10^5$ Pa) being more preferred. Depending on the intended use, the rotational velocity and operating pressure can be greater or smaller.

In addition to the hydraulic pressure applied to vessel 60 by stream 38, a centrifugal force is applied to stream 38 and vessel 60 as a result of the rotation of vessel 60. This centrifugal force increases as the distance away from rotational axis 90 increases. As such, the total force at the perimeter of vessel 60 may be several times that of the hydraulic pressure.

Stream 38 may include virtually any liquid which has been contaminated with a particulate component having a density greater than the liquid. For most applications, however, the liquid will be water. Thus, although water is referred to herein as the liquid being clarified, it will be understood that solid-liquid separator 10 of the present invention may be used to clarify a variety of liquids.

As illustrated in FIG. 10, feed stream 38 enters the solid-liquid separator 10 through feed stream inlet 114. As feed stream 38 reaches the rotating hollow shaft 98, it is forced through access ports 110 (see also FIG. 4) into the hollow shaft 98 where the stream is accelerated to the same rotational velocity as vessel 60. Flow through rotating hollow shaft 98 proceeds in the direction of arrow A. Upon reaching the entrance to vessel 60 adjacent inlet mounting flange 104, the centrifugal force imposed due to the rotation of vessel 60 pushes the stream radially outwardly towards wall 92 of vessel 60. As the stream enters vessel 60, it enters one of the flow channels 218 (FIG. 9) and proceeds to fill vessel 60.

Flow channels 218 help eliminate the Coriolis effect. That is, if fins 184 were removed, as the fluid enters vessel 60, the fluid would swirl in a vortex. Such swirling produces a turbulent flow that suspends particles within the fluid. As discussed below, in one embodiment solid-liquid separator 10 operates by settling the particulate matter against or adjacent to wall 92 of vessel 60 from where it is subsequently removed. By passing the fluid through discrete flow channels 218, swirling of the fluid is substantially eliminated. The fluid travels in a substantially laminar flow wherein the fluid rotates at the same speed as vessel 60. As a result, the potential for settling particulate within the liquid is maximized.

As stream 38 enters the vessel, it is forced around disc 176 along the direction of arrows B. Within vessel 60, the stream is subjected to the tremendous centrifugal forces imposed on it due to the rotation of vessel 60. Thus, the more dense component of the stream, i.e., the particulate matter, flows radially outwardly while the less dense component flows radially inwardly or stays on top. In one embodiment, the centrifugal forces present in solid-liquid separator 10 produce an average of approximately 500 g's to about 2,000 g's on the fluid mixture. The centrifugal force rapidly clarifies the fluid producing a low liquid content of the more dense particulate matter. Solid-liquid separator 10 can thus achieve in minutes or seconds the amount of separation that a static tank separator takes hours to achieve.

As discussed above, the particulate matter in stream 38 is forced by the rotation of vessel 60 to accumulate against wall 92 at equator 97. The accumulated particulate matter is identified as collected solids 224. A boundary line 228 is defined between collected solids 224 and the clarified water 226 radially inwardly disposed therefrom. Collected solids 224 are allowed to accumulate and boundary line 228 rise until boundary line 228 is located radially inward of opening 166 of extraction tubes 160 (a condition illustrated in FIG. 10). Collected solids 224 are subsequently extracted from pressure vessel 60 through extraction tubes 160 as described below.

Water flowing around the edge of disc 170 through axial flow passage 174 can stir up collected solids 224 that have settled at the largest dimension radius or equator 97 of pressure vessel 60. Although not always, in one embodiment this stirring caused by eddy effects works in opposition to the purpose of solid-liquid separator 10. Therefore, notches such as v-notches 210 previously discussed with regard to FIG. 6 may be cut in the outer perimeter of disc 170. The notches minimize stirring by reducing the force of the water flow around disc 170, thereby reducing the eddy effects. Thus the v-notches 210 maintain boundary layer 228 between collected solids 224 and clarified water 226.

Apart from functioning to support fins 184, the various discs, particularly disc 170, function to assist in the removal of the particulate matter. That is, all fluid that enters vessel 60 must flow either to or around the outer edge of disc 170 before it can exit vessel 60. By forcing all of the fluid to flow to the outer edge of disc 170 at equator 97, all of the fluid is subject to the greatest centrifugal force produced by the rotation of vessel 60, thereby ensuring that the highest concentration of particulate matter is removed from the incoming fluid. Discs 176 and 178 also function for this purpose. Furthermore, by positioning discs 176 and 178 on opposing sides of disc 170, the fluid flows radially inward and outward as it moves between the discs. This radial movement of the fluid increases the retention time of the fluid within the vessel, thereby subjecting the fluid to the centrifugal force of the vessel for a longer period of time. As a result, a larger portion of the particulate matter is removed. In an alternative embodiment, however, the inventive solid-liquid separator can be operated without the use of the discs, particularly disc 170.

Because gases may occasionally be found in fed stream 38, a gas layer 230 may form about axis 90 on the inlet side of vessel 60. Disc 170 effectively serves as a barrier between the inlet side and the outlet side of vessel 60. Hence, gases found within the feed stream will generally be found only on the inlet side of vessel 60 because they are likely to be separated before the liquid passes through axial flow passage 174.

As feed stream 38 continues to flow into the vessel 60, the fluid passes around the outer perimeter of center disc 170 and into the outlet side of vessel 60. Clarified water 226, which can be other fluids in other embodiments, fills the outlet side of vessel 60 and then flows out through effluent channel 132. Clarified water 226 subsequently exits solid-liquid separator 10 through effluent outlet 134 and pressure relief valve 136. Pressure relief valve 136 only opens when the back pressure in effluent outlet 134 overcomes the spring force for the valve, thereby ensuring that a predetermined pressure is maintained inside vessel 60. In an alternative embodiment, pressure relief valve 136 can be replaced with other operating systems that perform the same function. For example, pressure relief valve 136 can be replaced with an electronically operated valve and a pressure sensor. The valve is electronically opened when the pressure sensor senses a predetermined pressure within vessel 60 or outlet 134. In other embodiments, valve 136 can be self-adjusting so as to allow clarified water 226 to continually flow therethrough at a given pressure. Should the flow increase or decrease, valve 136 automatically opens or closes a proportional amount so that the pressure is held substantially constant.

Boundary line 228 is maintained at a desired level by periodically opening valve 148 and allowing collected solids 224 to be extracted through extraction tubes 160. When valve 148 is opened, a pressure gradient is created between the interior of vessel 60 and outlet removal line 76. Flow of collected solids 224 proceeds from the higher pressure environment within vessel 60 to the lower pressure through extraction tubes 160. This pressure differential may be created a number of ways, such as by operating vessel 60 at ambient pressure and imposing a negative pressure on extraction tubes 160, or, as is presently depicted, operating vessel 60 under pressure and imposing extraction tubes 160 to a near ambient pressure.

Recognizing that the eight extraction tubes 160 only extend into eight of the flow channels 218 (FIG. 9), boundary line 228 drops in these flow channels 218 as collected solids 224 are extracted. As boundary line 228 in these flow channels 218 drops, collected solids 224 from adjacent flow channels 218 flows through underflow passage 190 to maintain boundary line 228 at a generally constant level throughout the circumference of vessel 60. In an alternative embodiment, it is envisioned that an extraction tube 160 can be feed to each discrete flow channel 218. In this embodiment, it is not necessary to have underflow passage 190 between flow channels 218, i.e., fins 184 can extend all the way to wall 92 of vessel 60 along the length of fins 184.

When exit valve 148 is opened, any gas which has built up inside vessel 60 to form a gas layer 230 will immediately begin escaping through orifice 164 of plug 162 which is in fluid communication with removal channel 130. Thus, orifice 164 should preferably be sized such that any anticipated gas buildup may be removed through the periodic opening of valve 148. Orifice 164, however, should be sufficiently small so as to enable sufficient draw on extraction tubes 160 to remove collected solids 224. Thus, the size of orifice 164 depends in part upon the constituency and nature of the fluid flow. In one embodiment, orifice 164 has a threaded diameter of approximately 0.375 inch (1 cm). This 0.375 inch (1 cm) orifice is threaded to allow an insert whereby the orifice diameter may be reduced or even totally occluded, depending upon the insert selected. An insert may be threaded into orifice 164 even after construction of the pressure vessel 60 because orifice 164 remains accessible through exit orifice 140 and removal channel 130. The adjustable nature of this orifice diameter allows orifice 164 to be tailored for different fluid flows while using the same solid-liquid separator 10.

In one embodiment of the present invention, spherical vessel 60 has an inside diameter of about 19 inches (48 cm) and is capable of processing approximately 38 liters of water each minute. This provides a residence time of approximately 1.5 minutes in solid-liquid separator 10 while subjecting the water to an average of approximately 700 g forces. This is roughly the equivalent of 2 hours of residence time in a static clarifier having the same capacity. In one embodiment, the solid-liquid separator is capable of clarifying water to remove at least 99% of solids. In alternative embodiments, the present invention envisions that typical vessels can be formed having a maximum inside diameter in a range between about 6 inches (15 cm) to about 120 inches (300 cm) with about 12 inches (30 cm) to about 60 inches (150 cm) being more preferred. Such vessels can be designed to process fluid at a rate in a range from about 0 liters/minute to about 4,000 liters/minute with about 1 liter/minute to about 1,000 liters/minute being more preferred. It is appreciated that in other embodiments, the above variables can be larger or smaller.

The resulting particulate stream 40 is passed through a bag filter, filter press, and/or belt filter to remove remaining water and to "cake" the solids. The "caked" solids may then be disposed of by composting or other method known in the art. Ultimately, the disposal method will depend upon the composition of the "caked" solids. For instance, solids containing heavy metals cannot be composted and other appropriate disposal methods will be used.

To shut down solid-liquid separator 10, the pump and motor are turned off, then vessel 60 is drained and flushed. Alternatively, fluid may simply be left within the vessel 60 during non-use.

In one embodiment, depending on the operating parameters and the particle matter being collected, collected solids 224 can be difficult to fully extract from vessel 60 through extraction tubes 160. For example, collected solids 224 can be caked on wall 92 to such an extent that they do not freely flow into extraction tubes 160. In one approach to more easily and fully removing collected solids 224, the inflow of stream 38 to vessel 60 and the outflow of clarified water 226 from vessel 60 can be momentarily stopped. While vessel 60 continues to rotate, a removal stream can be pumped into removal channel 130 of exit tube 128 so that the removal stream passes down through extraction tubes 160 and into vessel 60.

As the removal stream passes into vessel 60, the removal stream resuspends the caked solids into surrounding fluid. The centrifugal force, however, keeps the particulate matter substantially adjacent to perimeter wall 92. Once the particulate matter is resuspended in a less dense phase, extraction tubes 160 can return to their original operation where the fluid containing the resuspended particulate matter is drawn out of vessel 60 through extraction tubes 160 and exit tube 128. Once a desired amount of the particular matter is removed, flow through extraction tubes 160 can be closed while rotating vessel 60 resettles the particulate matter against peripheral wall 92. Once the particulate matter is sufficiently settled, feed stream 38 and clarified water can again flow into and out of vessel 60.

As will be discussed below in greater detail different forms of nozzles can be placed at then end of extraction tubes 160 for more efficiently resuspended the particulate matter. Furthermore, a separate tube can be used to deliver the removal stream into vessel 60.

Figure 11:
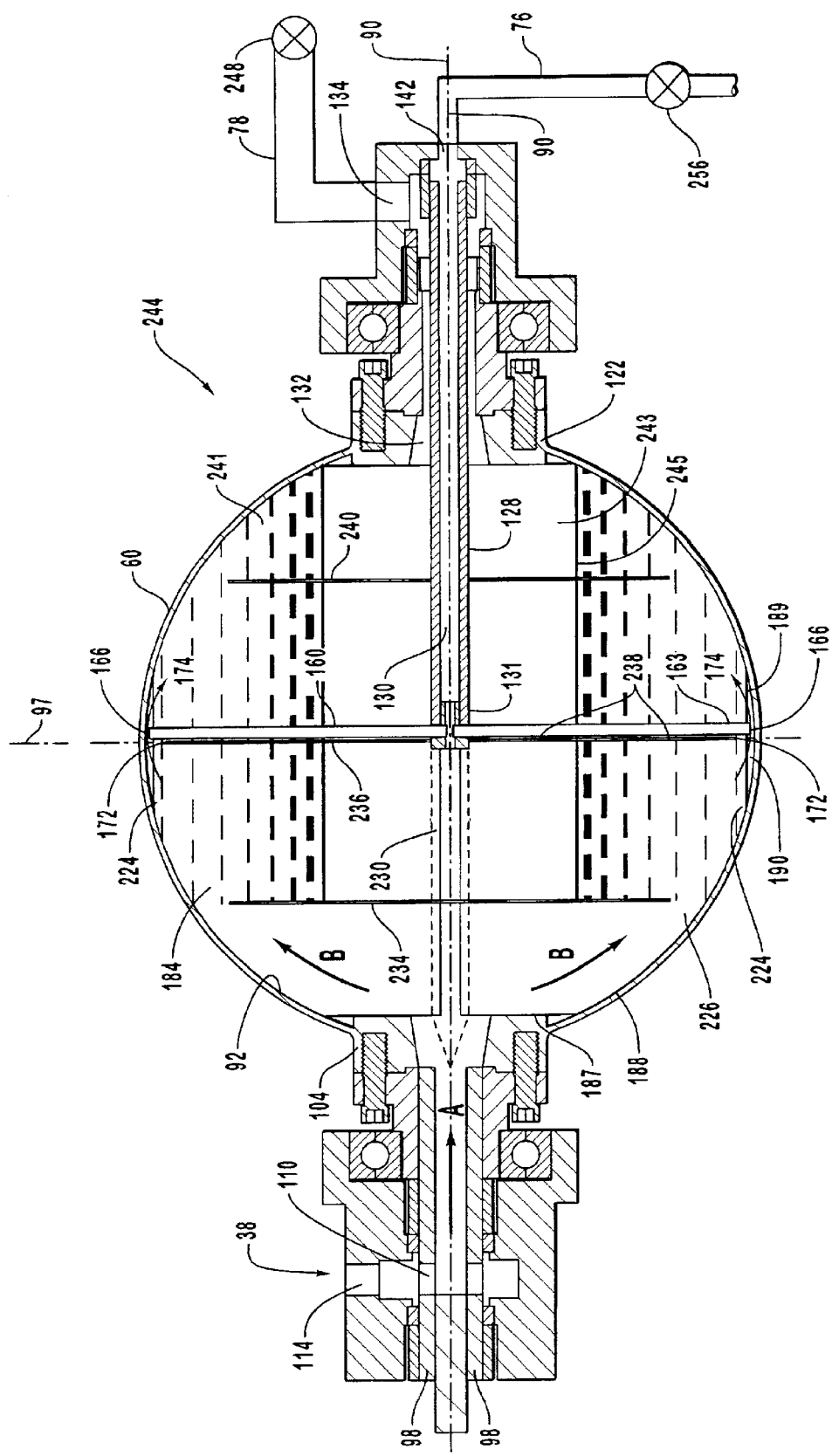
FIG. 11 is a cross-sectional view of one embodiment of a liquid-liquid separator of the present invention.
Figure 12:
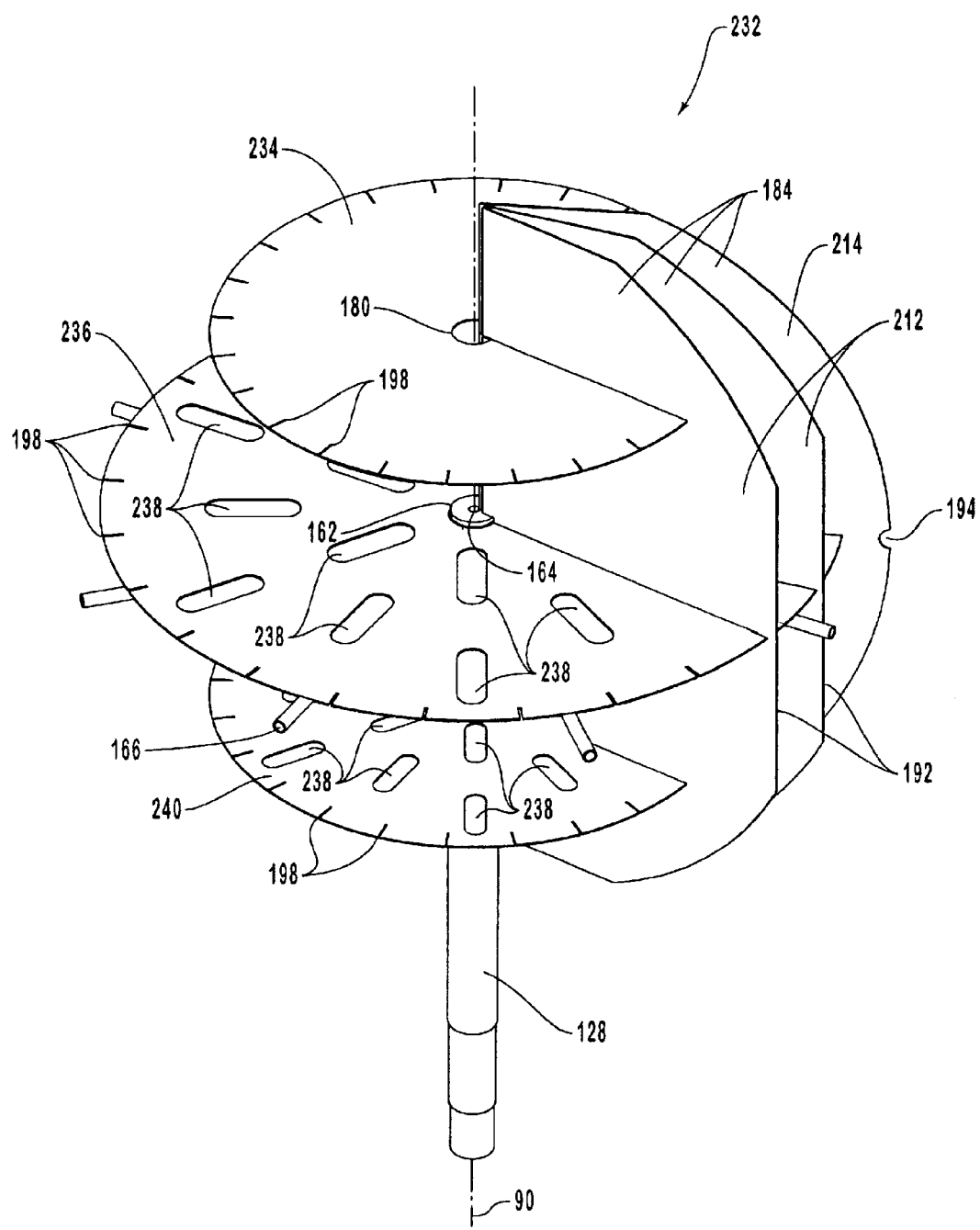
FIG. 12 is a perspective view of a partial assembly of the interior of the vessel of the liquid-liquid separator shown in FIG. 11, revealing a portion of the fin and perforated disc assembly.

Depicted in FIGS. 11 and 12, another embodiment of the present invention relates to a liquid-liquid separator 244 that uses a similar construction to solid-liquid separator 10 depicted in FIGS. 2–10. In contrast to solid-liquid separator 10 that is primarily designed to remove particulate from a fluid, liquid-liquid separator 244 is primarily designed to separate a mixed liquid of two or more immiscible liquids such as oil and water or any other types of immiscible liquids. Liquid-liquid separator 224 can thus be used as oil-water separator 22.

FIG. 12 illustrate a subassembly 232 of liquid-liquid separator 244. Subassembly 232 includes a solid inlet side minor disk 234 similar to inlet side minor disk 176 depicted in FIG. 6. A center disk 236 is depicted as having a plurality of perforations 238. Perforations 238 allow for the passage of the liquids therethrough. Additionally, an outlet side minor disk 240 is also depicted as having a plurality of perforations 238 extending therethrough.

As depicted in FIG. 11, the remainder of subassembly 232 and the vessel in which subassembly 232 is disposed are substantially the same as that previously discussed with regard to solid-liquid separator 10. As such, like elements are identified by like reference characters. Furthermore, the alternatives discussed above with regard to solid-liquid separator 10 are also applicable to liquid-liquid separator 244.

Liquid-liquid separator 244 also operates in a manner similar to solid-liquid separator 10. For example, with vessel 60 rotating, the mixed liquid is pumped into inlet 114 so as to flow down hollow shaft 98 along arrow A. Upon reaching the entrance to vessel 60, the mixed liquid enters one of the flow channels 218 (FIG. 9) and proceeds to fill vessel 60. As a result of the centrifugal force produced by the rotation of vessel 60 and the impact of the mixed liquid against minor disk 234, the mixed liquid is pushed radially outwardly towards wall 92 of vessel 60 and around disk 234.

The mixed liquid includes a heavy component 241 and a light component 243 which are defined by their relative densities. It is appreciated that heavy component 241 may also include comprise particulate matter. Where the mixed liquid includes more than two immiscible liquids, heavy component 241 or light component 243 can be defined to include more than one liquid. The drawn off liquid that includes more than one liquid can subsequently be processed through a second liquid-liquid separator 244 so as to separate the liquids therein.

As a result of the applied centrifugal force, heavy component 241 flows toward wall 92 at equator 97. Light component 243 flows toward the center or rotational axis 90 of vessel 60. As a result, a boundary line 245 is formed between heavy component 241 and light component 243. Boundary line 245 is maintained within a range of radial distances away from rotational axis 90. This liquid-liquid boundary line 245 is analogous to boundary line 228 depicted in FIG. 10 for solid-liquid separator 10. In contrast, however, liquid-liquid boundary line 245 is typically positioned at a radial distance from rotational axis 90 in a range from about ⅕ to about ⅘ the distance between rotational axis 90 and the maximum diameter at equator 97, preferably from about ¼ to about ¾ the distance, even more preferably from about ⅓ to about ⅔ the distance. In other embodiments, the distance can be smaller or larger.

As a result of perforations 238 extending through discs 236 and 240, light component 243 and gas 230 can flow through discs 236 and 240 and out effluent channel 132. Since gas 230 exits with light component 243, there is no need for a gas escape orifice at inlet end 131 of exit tube 128. In this embodiment, discs 236 and 240 function primarily as supports for fins 184 and thus can be any desired configuration. Alternatively, discs 236 and 240 can be removed.

Heavy component 241 is removed from vessel 60 through extraction tubes 160 and exit tube 128. Where there are fewer extraction tubes 160 than discrete flow channels 218, underflow passages 190 are formed between discrete flow channels 218 so that boundary line 245 is constant for all flow channels 218. Since boundary line 245 is typically closer to rotational axis 90 than boundary line 189, second end 163 of extraction tubes 160 can be moved closer to rotational axis 90.

Figure 13A:
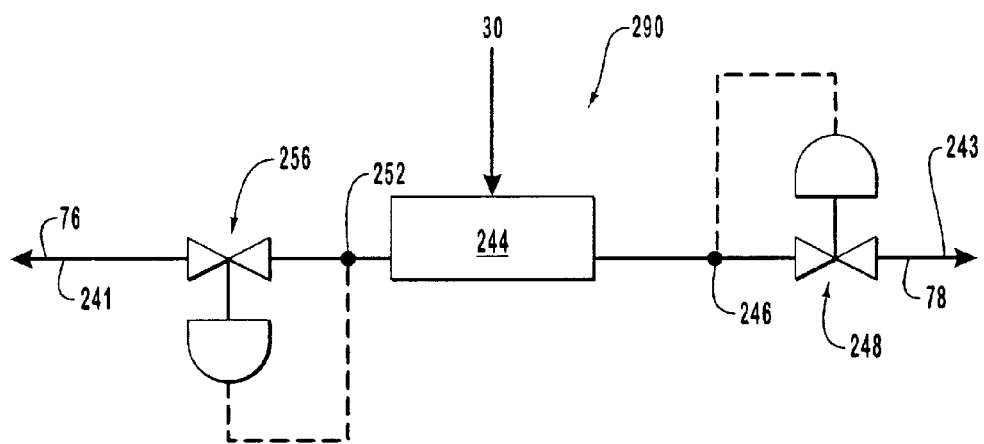
FIGS. 13A–13C are block diagrams showing alternative embodiments of valve assemblies controlling liquid flow into and out of the liquid-liquid separator.

In one embodiment of the present invention, means are provided for pressurizing the fluid within pressure vessel 60 so as to automatically control the position of boundary line 245 within pressure vessel 60 as the ratio of light component and heavy component of the fluid entering pressure vessel 60 changes. Several alternative examples of such means are described below. By way of example and not by limitation, depicted in FIGS. 11 and 13A is one embodiment of a control system 290 for removing the separated liquids from liquid-liquid separator 244. Specifically, a supply stream 30 containing two immiscible liquids is fed to liquid-liquid separator 244 where the two liquids are separated within pressure vessel 60 into heavy component 241 and light component 243 as discussed above. Control system 290 includes a first valve 248 coupled with effluent line 78 and a second valve 256 coupled with removal line 76.

According to the present invention, a pressure differential is maintained between first valve 248 and second valve 256. The pressure differential is needed to maintain boundary line 245 at a defined radial distance from rotational axis 90 such that only light component 243 exits through effluent channel 132 and effluent line 78 and only heavy component 241 exits through extraction tubes 160, exit tube 128, and removal line 76. Failure to establish and maintain a pressure differential between valves 248 and 256 can result in boundary line 245 extending beyond extraction tubes 160 such that a portion of light component 243 exits with heavy component 241 through extraction tubes 160 or can result in boundary line extending into effluent channel 132 such that a portion of heavy component 241 exits with light component 243 through effluent channel 132.

The pressure differential is based on the operating properties of separator 244, such as rotational velocity, and the material properties of supply stream 30, such as the density and viscosity of the at least two immiscible liquids contained within supply stream 30. The pressure differential is also based on the desired location of boundary line 245 within vessel 60. It is appreciated that in some embodiments the pressure differential can be zero or substantially zero so as to maintain boundary line 245 at the desired location.

In practice, the pressure differential can be empirically determined. For example, initially first valve 248 is set to operate at a first pressure. That is, first valve 248 maintains the exiting light component 243 at the first pressure while enabling exiting light component 243 to continually flow through first valve 248. Accordingly, if the flow of exiting light component 243 decreases, first valve 248 automatically closes a corresponding amount so as to maintain the first pressure. In this regard, first valve 248 can comprises a back-pressure regulator such as a Fisher 98L made by Fisher Controls International, Inc., out of Marshall Town, Iowa.

Alternatively, first valve 248 can comprise a piloted or controlled back-pressure regulator, also available from by Fisher Controls International, Inc., which operates in communication with a pressure sensor 246 coupled effluent line 78. In either the above embodiments or other alternative valve configurations, first valve 248 is configured to automatically adjust so as to maintain a desired pressure on exiting light component 243 as the flow rate thereof changes. Where the flow rate is substantially constant, first valve 248 can be configured for manual rather than automatic adjustment.

The amount of first pressure is in some regards arbitrary since it is the pressure differential that controls the position of boundary line 245. In one embodiment, however, first pressure is typically in a range between about 1 psi ($6.89 \times 10^3$ Pa) to about 600 psi ($4.14 \times 10^6$ Pa) with about 30 psi ($2.07 \times 10^5$ Pa) to about 125 psi ($8.61 \times 10^5$ Pa) being more preferred. In other embodiments, the pressure can be greater or smaller.

Once the first pressure for first valve 248 is set, second valve 256 is initially set to operate at the same pressure. Liquid-liquid separator 244 is then operated at a flow rate for supply stream 30 and at a defined rotational velocity for vessel 60. The operating pressure for second valve 256 is then incrementally varied in opposite directions so as to determine the extreme operating pressures for second valve 256. For example, the operating pressure for second valve 256 can be incrementally decreased and then incrementally increased so as to determine the pressures for second valve 256 at which light component 243 first starts to flow out of removal line 76 with heavy component 241 and heavy component 241 first starts to flow out of effluent line 78 with light component 243.

Once the two extreme operating pressures for second valve 256 are determined, second valve 256 is set to operate at a pressure between the two extreme pressures. This places boundary line 245 substantially centrally between the opening to effluent channel 132 and opening 166 to extraction tubes 160. Alternatively, second valve 256 can be set to operate at any desired pressure between the two extreme pressures. The resulting pressure difference between first valve 248 and second valve 256 defines the pressure differential. Second valve 256 can comprise the same type of valves as discussed above with regard to first valve 248. As such, in one embodiment, second valve 256 can operate in conjunction with a pressure sensor 252 coupled with removal line 76.

One of the unique benefits of the inventive system is its ability to compensate for changes in the ratio of the two immiscible liquids in supply stream 30. For example, assuming an oil/water supply stream 30 feeds liquid-liquid separator 244 at a 50/50 mixture. At a given time, the 50/50 mixture suddenly experiences a load change to 10% oil and 90% water. Where the rotational velocity of liquid-liquid a separator 244 remains substantially constant, an increased amount of water (heavy component 241) will tend to cause boundary line 245 to move toward rotational axis 90. Accordingly, the pressure sensed at first valve 248 will decrease while the pressure sensed at second valve 256 will increase. As a result, second valve 256 will automatically close slightly and first valve 248 will automatically open slightly. As a result, the operating pressures for valves 248 and 256 and the pressure differential between valves 248 and 256 are continually held relatively constant even though the ratio of liquids in supply stream 30 may continually change. As such, the position of boundary line 245 is held relatively constant within vessel 60.

A 100% water supply stream 30 or a 100% oil supply stream 30 may also be controlled by maintaining boundary line 245 within the preferred distance range from rotational axis 90. For example, where a 100% oil supply stream 30 is fed to liquid-liquid separator 244, second valve 256 will eventually shut entirely in order to maintain the liquid-liquid interface within the preferred distance range away from rotational axis 90. Accordingly, where all liquid in supply stream 30 is oil, the oil will move through liquid-liquid separator 244 substantially without any mixing with the water that, under this situation, would be substantially stagnant therein.

Figure 13B:
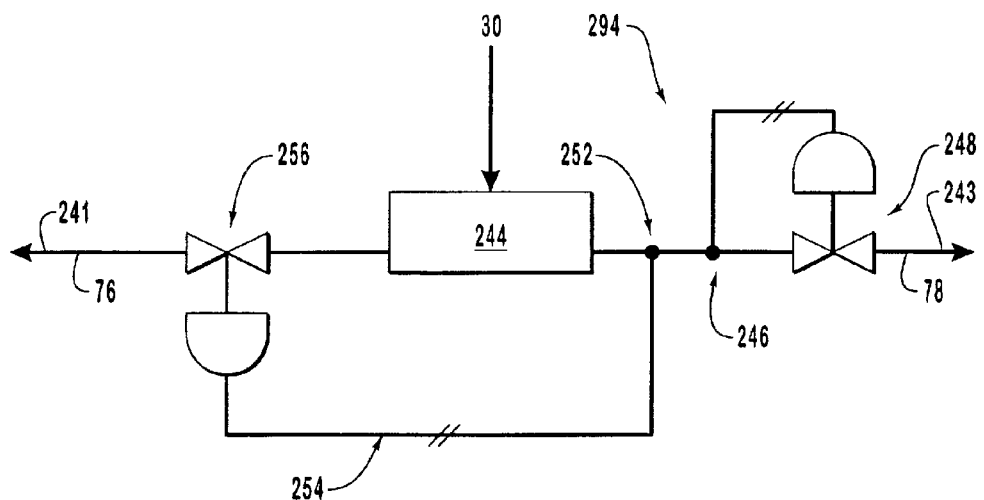

Another embodiment of a control system 294 is depicted in FIG. 13B. Like elements between control system 290 and 294 are depicted by like reference characters. In contrast to control system 290 where second valve 256 measures the pressure in removal line 76, in control system 294 pressure sensor 252 is coupled with effluent line 78. A signal line 254 couples sensor 252 to second valve 256. In this embodiment, second valve 256 is set to operate at a pressure differential relative to the set operating pressure of first valve 248. By way of example, where first valve 248 is set to operate at 20 psi, second valve 256 may be set to operate at a pressure of +5 psi relative to the sensed pressure in effluent line 78. Accordingly, although both valves 248 and 256 measure the pressure in effluent line 78, a predefined pressure differential is maintained between the two valves. Although sensors 246 and 252 are shown in FIG. 13 as both being coupled with effluent line 78, in an alternative embodiment sensors 246 and 252 can each be coupled with removal line 76. In one embodiment second valve 256 may be a differential pressure regulator such as a Fisher 98LD made by Fisher Controls International, Inc., out of Marshall Town, Iowa.

In yet another embodiment, it is appreciated that first valve 248 in control system 294 can be configured such that it does not adjust the pressure on effluent line 78 as the flow rate of fluid passing therethrough changes. For example, first valve 248 can be configured such that as the amount of exiting light component 243 passing therethrough decreases, the fluid pressure within effluent line 78 can also be allowed to decrease. However, since second valve 256 is set to operate at a pressure relative to the pressure of effluent line 78, the operating pressure of second valve 256 also decreases, thereby maintaining the desired pressure differential between valves 248 and 256.

Figure 13C:
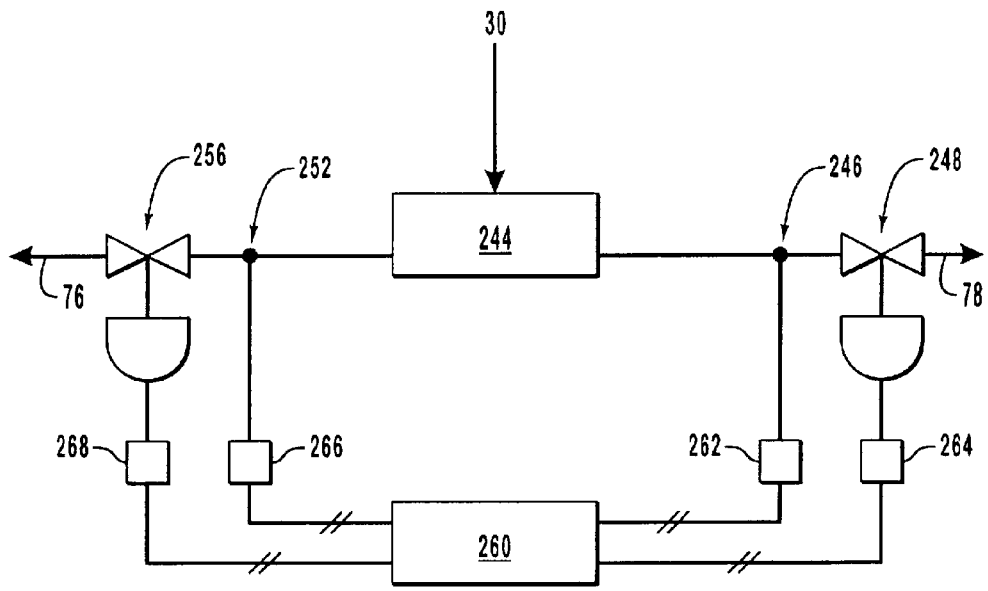

In yet another embodiment depicted in FIG. 13C, a controller 260 is used to withdraw the separated fluids from liquid-liquid separator 244. Signals are transmitted from first pressure sensor 246 by use of a first transmitter 262 that operates, by way of non-limiting example with a 4–20 mA signal. Similarly, first valve 248 transmits a signal by use of a first I/P converter 264 also with a 4–20 mA signal. First I/P converter 264 converts a 4–20 mA control signal to a pneumatic signal in order to operate first valve 248. Removal line 76 is also configured with second pressure sensor 252, a second transmitter 266, a second valve 256, and a second I/P converter 268.

According to the present invention, when a load disturbance occurs within supply stream 30, first pressure sensor 246 and second pressure sensor 252 detect a change in respective pressures between exiting heavy component 241 passing through removal line 76 and exiting light component 243 passing through effluent line 78. According to the present invention, such a load disturbance will be noted by controller 260 and respective valves 248 and 256 will be adjusted in order to maintain boundary line 245 at a preferred distance range away from rotational axis 90. According to this embodiment of the present invention, the pressure differential is maintained by the control of first valve 248 and second valve 256. Accordingly, the location of boundary line 245 may be maintained within the preferred distance range away from rotational axis 90.

In another configuration for operation, the embodiments depicted in FIGS. 13A, 13B and 13C can be mixed. For example, an alternative system could provide first valve 248 on effluent line 78 as discussed above with regard to FIG. 13A and second valve 256 on removal line 76 as discussed with regard to FIG. 13C. Second valve 256 would be coupled with the sensor, controller and other electronics as also discussed with regard to FIG. 13C.

Figure 14:
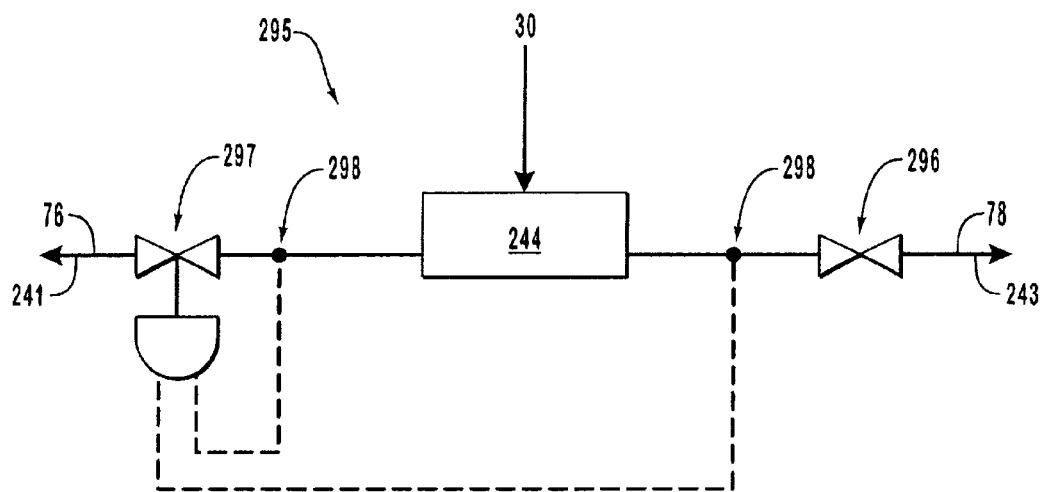
FIG. 14 is a block diagram showing another embodiment of a valve assembly controlling liquid flow into and out of the liquid-liquid separator.

Depicted in FIG. 14 is a control system 295 that operates in a slightly different way. Control system 295 includes a valve 296 coupled with effluent line 78. Valve 296 comprises a ball valve or other type of valve which can be fixed to produce a constant defined opening so that under normal operating procedures exiting light component 243 is under a first pressure. As the flow rate changes, however, it is not necessary for valve 296 to adjust to maintain the pressure.

Control system 295 also includes a valve 297, such as a solenoid valve, that is designed to selectively fully open and fully close. Valve 297 is electrically coupled with a sensor 298 that can be coupled with removal line 76 or effluent line 78. Valve 297 is set to fully open and close over a pressure range. For example, during one mode of operation valve 296 is always left open a defined amount while valve 297 is initially closed. When the pressure sensed by sensor 298 reaches a defined upper limit, as a result of the heavy component collecting within vessel 60, valve 297 is opened allowing the heavy component to exit therethrough. Valve 297 remains open until the pressure sensed by sensor 298 drops to a lower limit at which time valve 297 is closed and the process is repeated. By controlling valve 297 over a narrow pressure range, boundary line 245 remains relatively constant. In alternative embodiments, it is appreciated that valves 296 and 297 can be switched between lines 76 and 78. Furthermore, valve 297 can be set to open and close over a defined time range and/or pressure range.

One feature of one embodiment of the present invention relating to control of the liquid-liquid separation system is the ability to separate immiscible liquids that have a specific gravity difference of less than about 5% of each other. The present invention is useful for separating immiscible liquids that have a specific gravity difference in a range from about 5% to about 0.5%, more preferably from about 4% to about 0.5%, and most preferably from about 3% to about 0.5%. Of course, the present invention is useful for separating immiscible liquids that have a specific gravity difference greater than 5%. Where a given liquid-liquid system is provided such that the specific gravities of the two liquids are known, control of such systems is achieved by the present invention. Calibration may be conducted for a given rotating pressurized vessel as disclosed herein. A first rpm may be established and various pressure differences noted for different ratios of the two liquids. A curve may be fitted to these a data. Similarly, other rpm amounts may be tested in order to calibrate the rotating pressure vessel. By use of standard control methods such as a PID controller, the rpm amount of the rotating pressure vessel may be tracked and the liquid-liquid system separated by maintaining the boundary layer 245 within a desired range.

Figure 15:
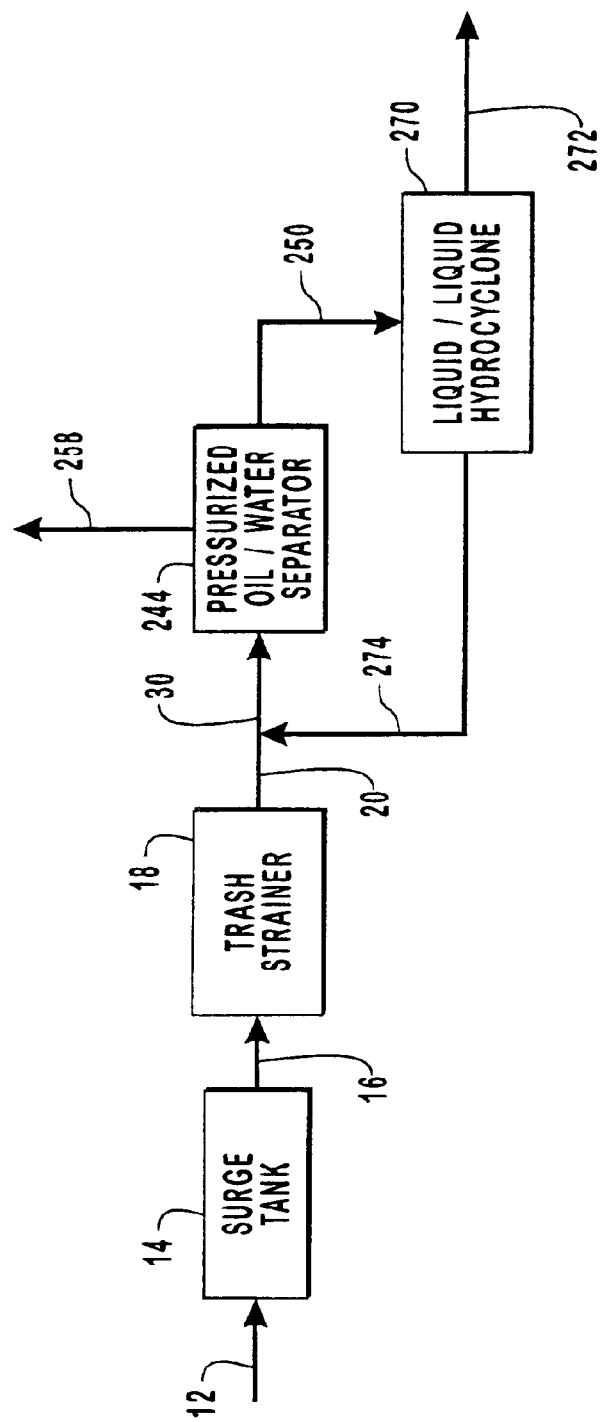
FIG. 15 is a block diagram overview of one process of the present invention that uses the liquid-liquid separator in connection with a hydrocyclone.

One application of liquid-liquid separator 244 is depicted in FIG. 15. Under certain conditions, environmental discharge regulations may require water to be cleaned of its entrained oil to a level below about 100 ppm. According to the embodiment of the present invention depicted in FIG. 15, feed stream 12 comprises substantially no loose particulate material except for any incidental trash that may be removed in trash strainer 18. Supply stream 30 enters liquid-liquid separator 244 and the two immiscible liquids are separated as described above.

An exiting heavy component stream 250, which can comprise water in an oil/water system, is feed to a liquid-liquid hydrocyclone 270. Hydrocyclone 270 accomplishes a separation therein that removes more of the light component liquid from a concentration above about 100 ppm down to a concentration of less than about 10 ppm.

For example, where an oil/water system is provided, exiting heavy component stream 250 comprising the water may have an oil content of about 100 ppm. Liquid-liquid hydrocyclone 270 provides a purified heavy component liquid stream 272 that has an oil content in a range from about 0.1 to about 100 ppm, preferably from about 1 to about 10 ppm, and more preferably from about 2 to about 5 ppm. A recycle light component liquid stream 274 is drawn off liquid-liquid hydrocyclone 276 and is blended with flow path 20 to form supply stream 30. Typically, in a 50/50 oil/water flow path 20, the content of water within recycle light component liquid stream 274 will a be in a range from about 50% water to about 80% water. Hydrocyclone 276 can comprise any hydrocyclone know to those skilled in the art. One example of a hydrocyclone is disclosed in U.S. Pat. No. 5,133,861.

Accordingly, a method of separating a liquid-liquid mixture by use of separator 244 depicted in FIG. 11 may include one of the control systems depicted in FIGS. 13 and 14 or combination thereof and may additionally include a hydrocyclone that is connected to the heavy component outlet.

Figure 16:
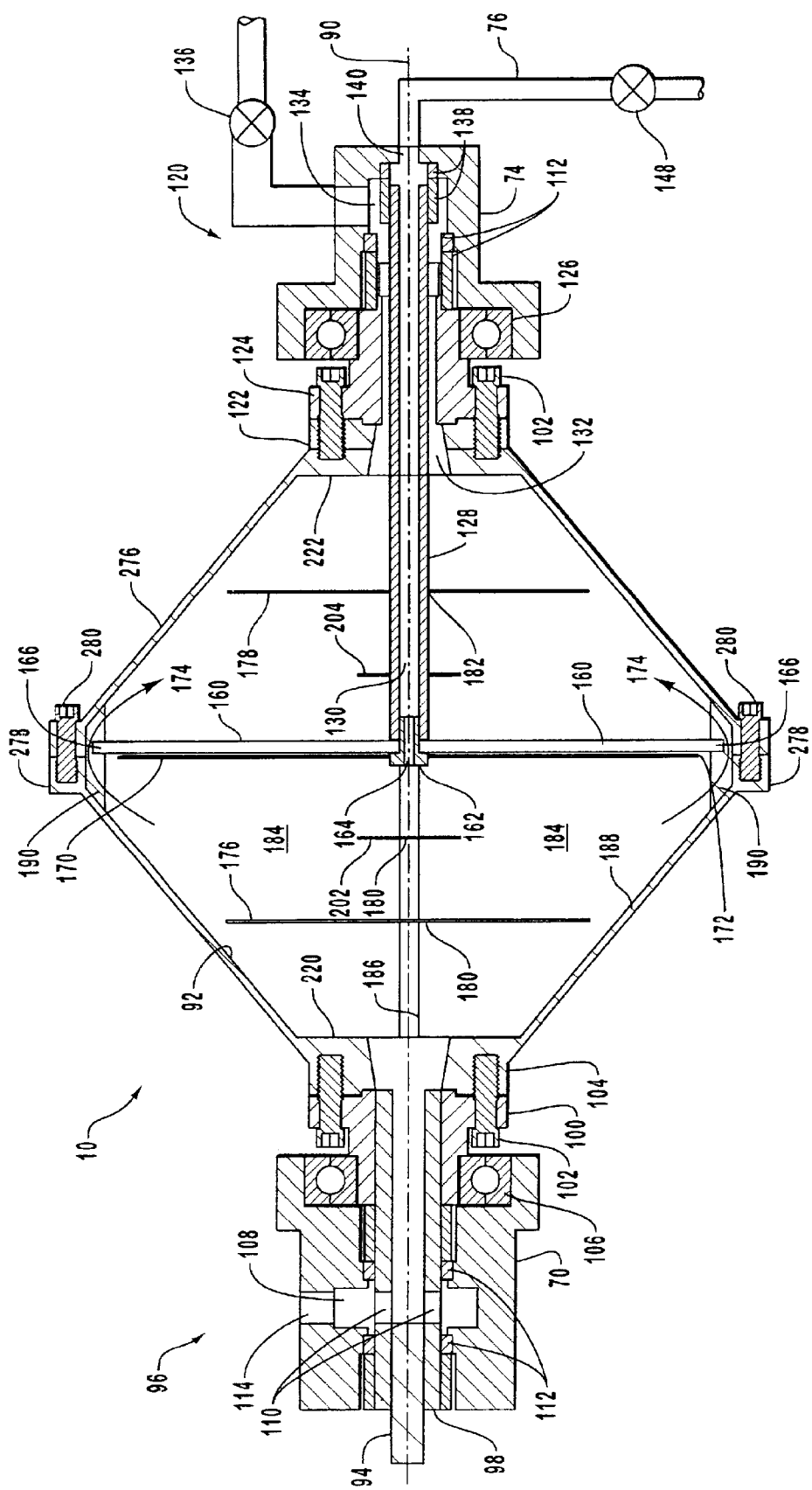
FIG. 16 is a cross-sectional view of an alternative embodiment of a separator, wherein the spherical pressure vessel has been replaced with a double frusto-conical pressure vessel.

Another embodiment of the present invention is depicted in FIG. 16, wherein the more expensive sphere pressure vessel 60 has been replaced with a double truncated cone pressure vessel 276. FIG. 16 depicts extraction tubes 160 that are longer than their equivalents depicted in FIG. 3. Additionally, a flanged edge 278 of the double truncated cone 276 is provided with a bolt 280 in order to assemble double truncated cone 276. A gasket or an o-ring (not pictured) may be placed between mating surfaces of flanged edge 278 in order to achieve a liquid-tight seal that holds under the pressure contemplated for the present invention.

FIG. 16 also depicts the axial flow passage 174 to be more angular due to the shape of double truncated cone 276. One distinction of double truncated cone 276 is the absence of a decreasing flow slope. In other words, the flow slope along vessel wall 92 is constant for solid particulate matter or a heavy component liquid as it moves along vessel wall 92 in the direction toward radial extraction tube opening 166.

Figure 17:
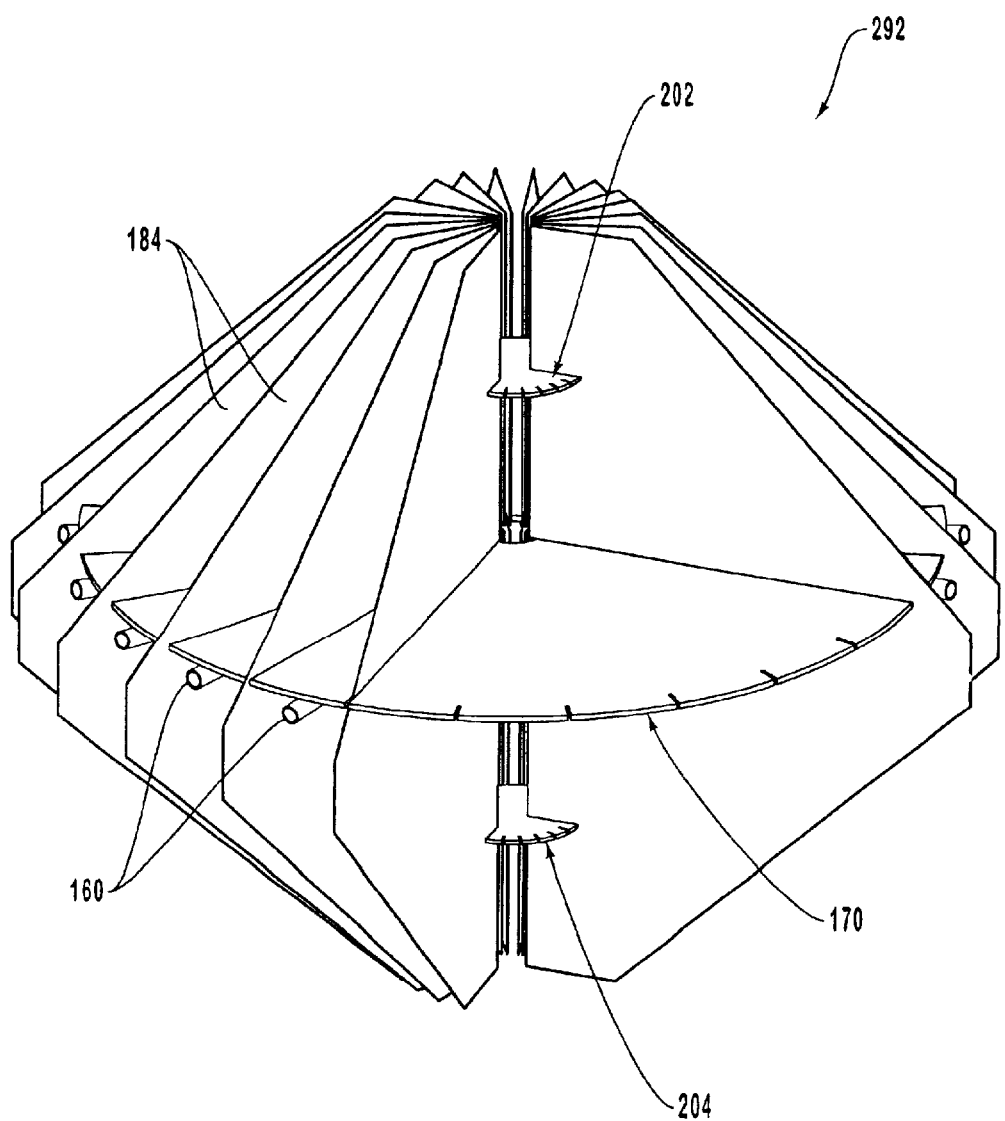
FIG. 17 is a perspective view of a partial assembly of the interior of the vessel of the separator shown in FIG. 16.

FIG. 17 is a perspective view of a separator subassembly 292 including additional disks 202, 204 along with at least one major disk such as center disk 170. FIG. 17 depicts a fin shape for radial fins 184 that conform with the double truncated cone shape of pressure vessel 276. An additional distinction between subassembly 292 and corresponding components in solid-liquid separator 10 is that an extraction tube 160 is disposed between each fin 184 in subassembly 292. In this embodiment, underflow passage 190 need not be formed between adjacent flow channels 218. According to the present invention, double truncated cone 270 depicted in FIGS. 16 and 17 may be used with either a solid-liquid separator or a liquid-liquid separator.

In yet another embodiment, it is envisioned that a single separator can be configured to simultaneously separate both two or more immiscible liquids and particulate matter from a fluid steam. The separator can be configured substantially identical to those disclosed in FIGS. 10 and 11. In this embodiment, however, the particulate matter collects at the farthest radial distance from the rotational axis, the lighter of the two immiscible liquids collects about the rotational axis, and the heavier of the two immiscible liquids collects between the particulate matter and the lighter liquid. Two separate sets of extractions tubes are used. The first set extends down to the particulate matter for extraction thereof. This is similar to that previously discussed with regard to FIG. 10. The second set of extraction tubes extends to the heavier liquid for extraction thereof. The lighter liquid exits in the same manner as previously discussed with regard to FIG. 11.

Figure 18:
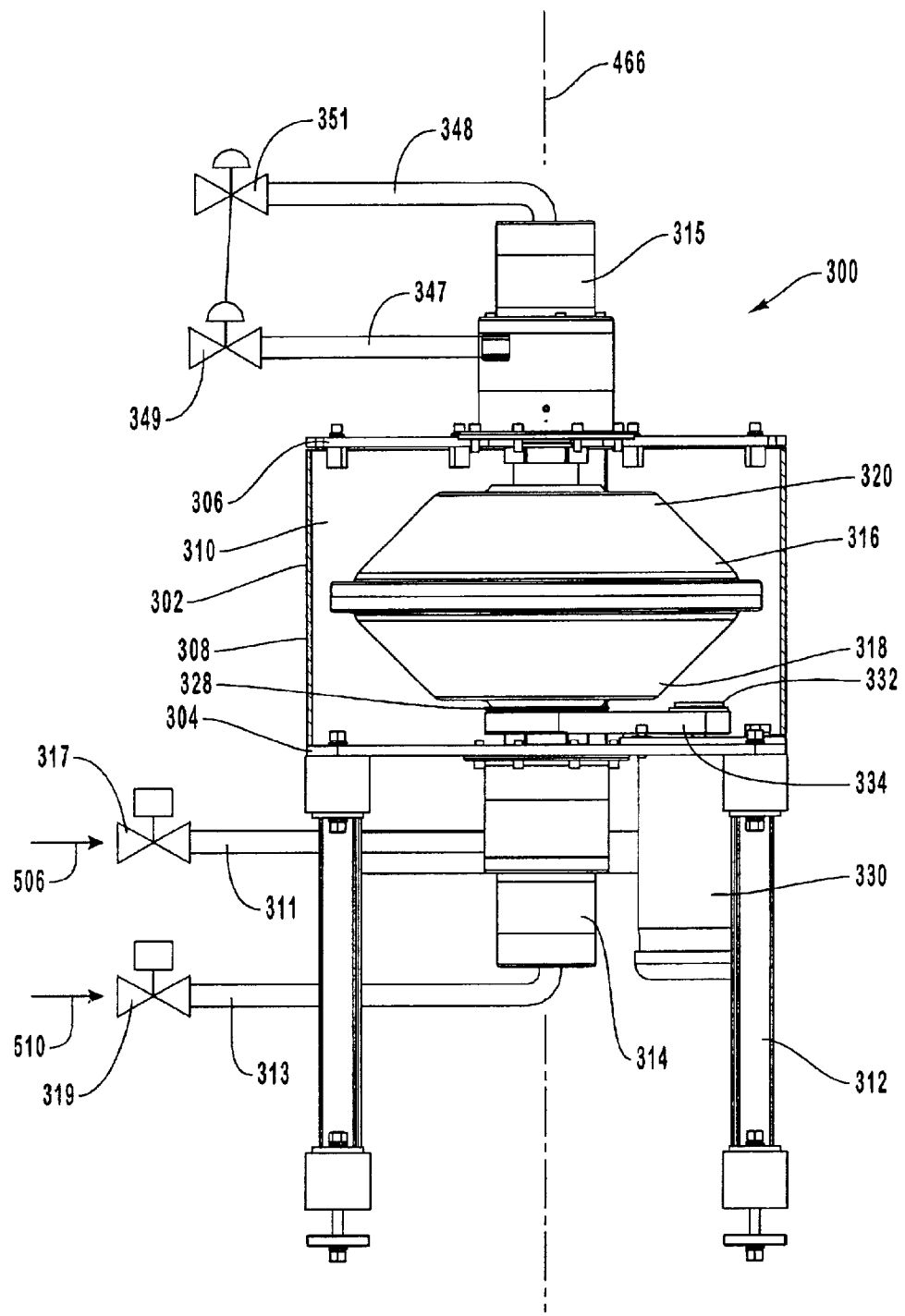
FIG. 18 is an elevational side view of an alternative embodiment of a separator that can function as a solid-liquid and/or liquid-liquid separator.

Depicted in FIG. 18 is another alternative embodiment of a separator 300 which can function as a solid-liquid separator and/or a liquid-liquid separator. Separator 300 comprises a frame assembly 302 which includes a horizontally disposed base plate 304 and a spaced apart head plate 306 in substantially parallel alignment therewith. A cylindrical guard 308 extends between base plate 304 and head plate 306 so as to bound a compartment 310. Base plate 304 is supported by a plurality of adjustable legs 312 downwardly projecting therefrom.

Attached to and extending below base plate 304 is a stationary inlet housing 314. As discussed below in greater detail, a fluid inlet line 311 and a fluid delivery line 313 are each fluid coupled with inlet housing 314. Fluid inlet line 311 is used to deliver the fluid that is to separated, clarified, and/or otherwise treated. Accordingly, depending on the configuration and intended use of separator 300, fluid inlet line 311 can comprise flow path 20 or effluent stream 38 of FIG. 1. Delivery line 313 is used to deliver a fluid to a pressure vessel of separator 300 for use in removing particulate matter collected within the pressure vessel. A valve 317 is coupled with fluid inlet line 311 while a valve 319 is coupled with delivery line 313.

A stationary outlet housing 315 is attached to head plate 306 and upwardly extends therefrom. Fluid coupled with outlet housing 315 is a removal line 347 and an effluent line 348. Removal line 347 is used for the removal of solids and heavier fluids while effluent line 348 is used for removal of the clarified and/or lighter fluids. Shut off valves 349 and 351 are coupled with removal line 347 and effluent line 348, respectively.

Figure 19:
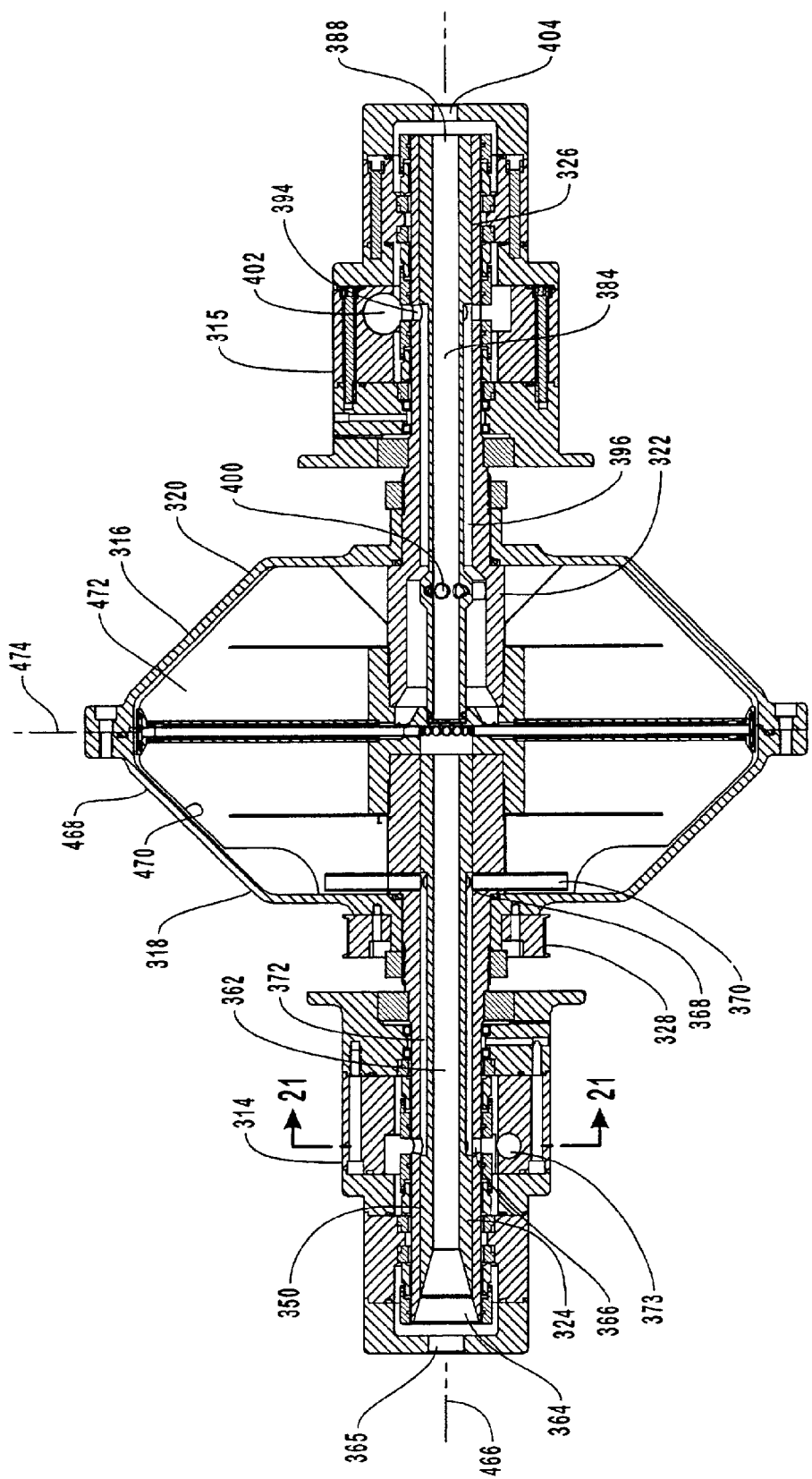
FIG. 19 is a cross sectional side view of the separator shown in FIG. 18 without the supporting frame.

Rotatably disposed within compartment 310 is a pressure vessel 316 having an inlet end 318 and an opposing outlet end 320. As depicted in FIG. 19, pressure vessel 316 is mounted for rotation about a rotational axis 466. Pressure vessel 316 includes a peripheral wall 468 having an interior surface 470 bounding a chamber 472. As previously discussed with regard to pressure vessel 60, pressure vessel 316 and chamber 472 can have a variety of different configurations and can be made of a variety of different materials so as to withstand a desired internal pressure. Although not required, in the embodiment depicted the walls of pressure vessel 316 slope radially outward toward an equator 474 having a maximum diameter that encircles rotational axis 466.

A shaft assembly 322, which is also configured to rotate about rotational axis 466, extends through and is rigidly coupled with pressure vessel 316. Shaft assembly 322 includes an inlet end 324 that is rotatably supported within inlet housing 314. Shaft assembly 322 also includes an outlet end 326 that is rotatably supported within outlet housing 315.

Encircling shaft assembly 322 and attached to pressure vessel 316 at inlet end 318 is an annular pulley 328. Returning to FIG. 18, a motor 330 is mounted to base plate 304. Motor 330 rotates a drive wheel 332 which is also disposed within compartment 310. A belt 334 extends between drive wheel 332 and pulley 328 so as to facilitate rotation of pressure vessel 316 and shaft assembly 322 relative to stationary inlet housing 314 and stationary outlet housing 315. In this regard, it is appreciated that bearings are disposed between shaft assembly 322 and housings 314 and 315.

Figure 20:
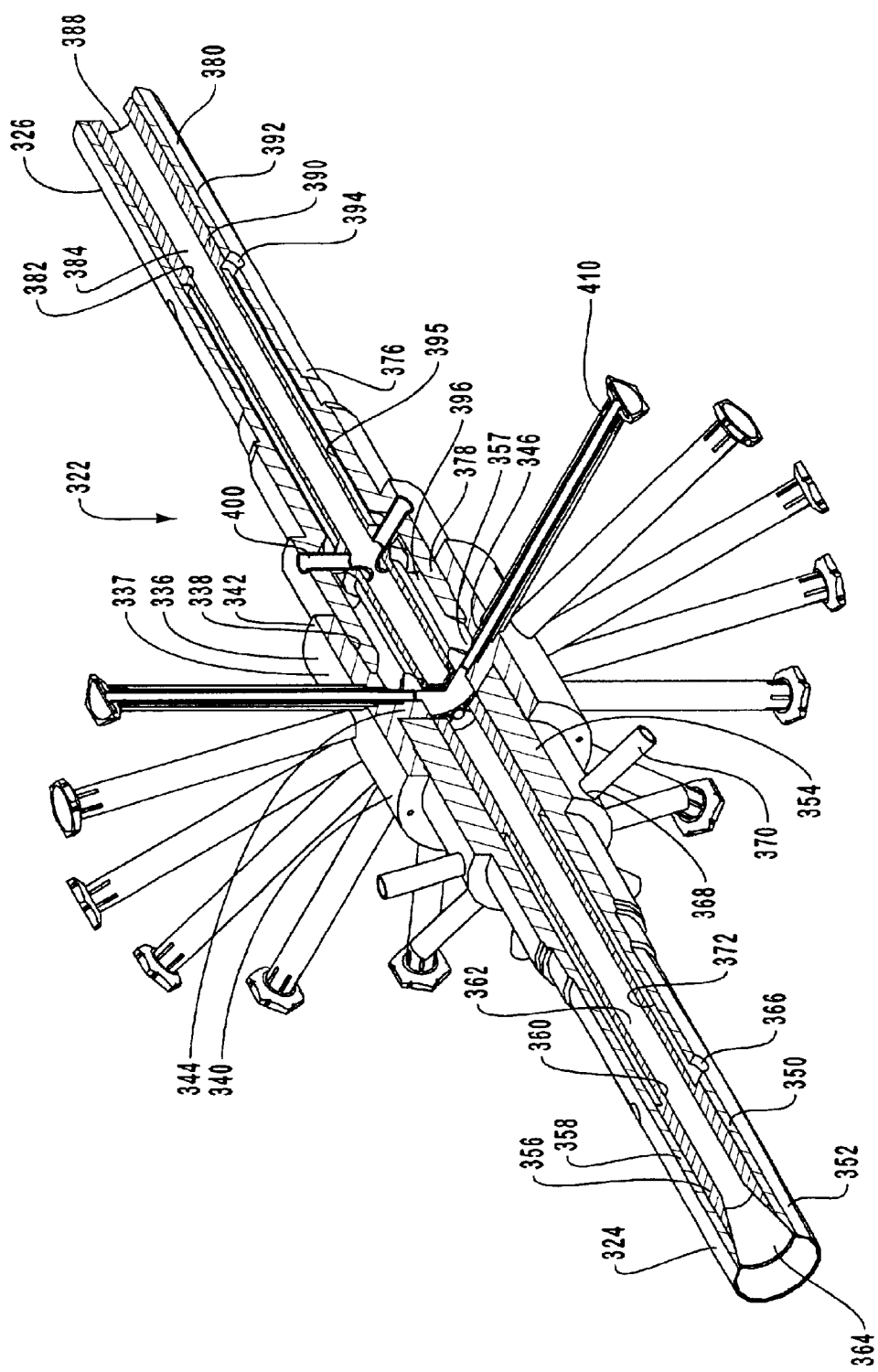
FIG. 20 is a partially cutaway perspective view of a shaft assembly of the separator shown in FIG. 19.
Figure 22:
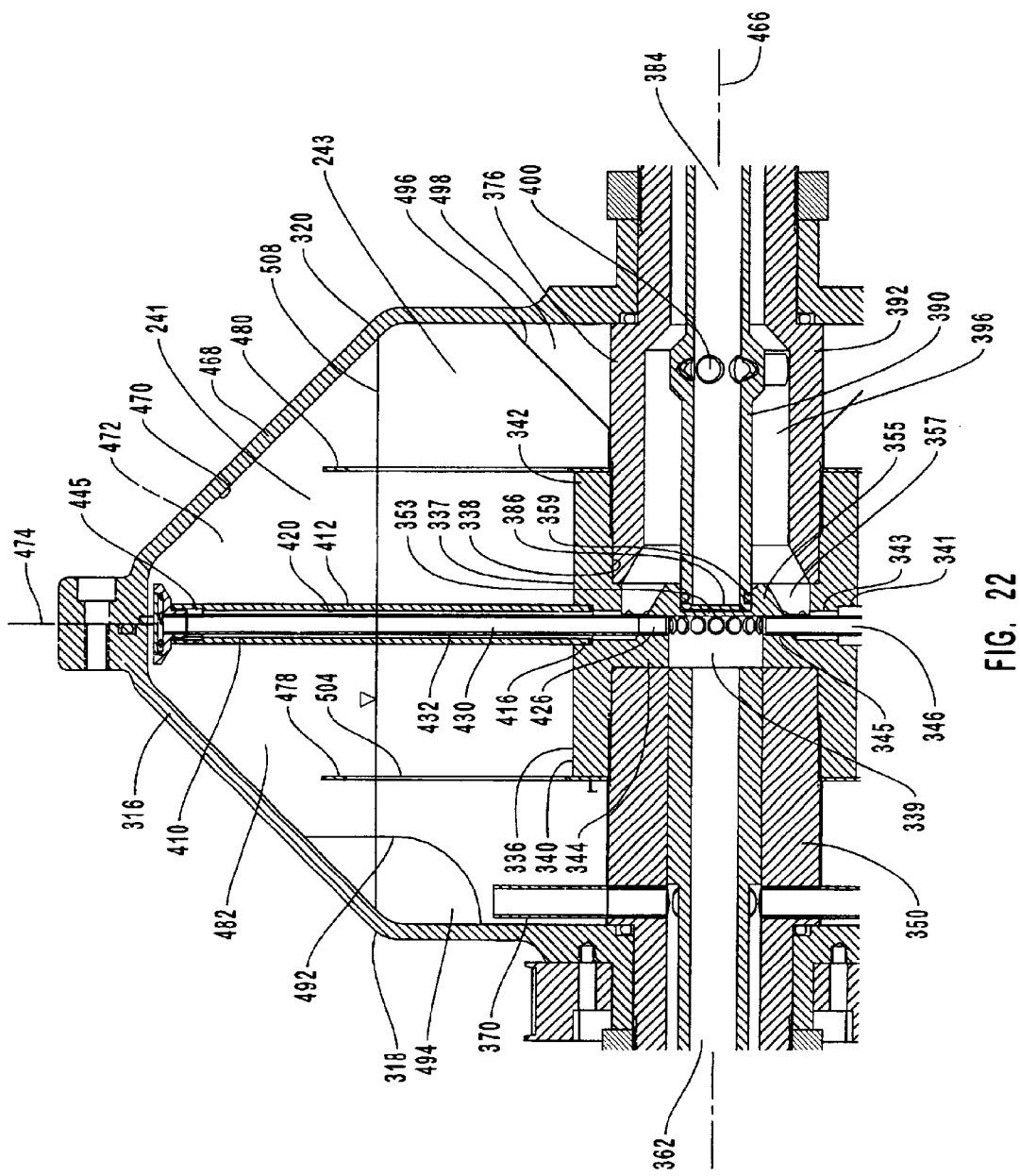
FIG. 22 is an enlarged cross sectional view of the pressure vessel of the separator shown in FIG. 19.

Depicted in FIG. 20, shaft assembly 322 comprises a central manifold 336. As depicted in FIG. 22, manifold 336 comprises a substantially cylindrical collar 337 having an interior surface 338 that extends between an inlet end 340 and an opposing outlet end 342. Radially inwardly projecting from interior surface 338 of collar 337 is an annular flange 344. Flange 344 circles a compartment 339. A plurality of radially spaced apart channels 346 extend through manifold 336 and flange 344 at the outlet side of flange 344. Each channel 346 comprises a first channel portion 341, a second channel portion 343, and a third channel portion 345, each portion being concentrically disposed and consecutively constricting toward compartment 339.

An end wall 353 extends across flange 344 on the outlet side of channels 346 so as to bound one side of compartment 339. An annular mouth 355 projects from end wall 353 and flange 344 toward outlet end 342. Extending between mouth 355 and collar 337 so as to communicate with second channel portion 343 of each channel 346 is an annular slot 357.

Returning to FIG. 20, shaft assembly 322 also includes a tubular input shaft 350. Input shaft 350 extends from a first end 352, which corresponds to inlet end 324 of shaft assembly 322, to an opposing second end 354. Second end 354 is securely disposed within inlet end 340 of manifold 336 so as to bias against flange 344. Input shaft 356 has an interior surface 360 that bounds a fluid delivery channel 362. Delivery channel 362 extends from an inlet mouth 364 at first end 352 to channels 346 of manifold 336. As depicted in FIG. 19, inlet mouth 364 is in sealed fluid communication with a coupling port 365 formed on inlet housing 314. In turn, coupling port 365 is fluid coupled with fluid delivery line 313 as previously discussed with regard to FIG. 18. As such, fluid entering through delivery line 313 passes through inlet housing 314 and into fluid delivery channel 362.

Returning to FIG. 20, input shaft 350 comprises a tubular inner shaft 356 and a tubular outer shaft 358 encircling inner shaft 356. Inner shaft 356 and outer shaft 358 each extend between first end 352 and second end 354. A plurality of radially spaced apart inlet ports 366 extend through outer shaft 358 at or toward first end 352. Similarly, a plurality of radially spaced apart outlet ports 368 extend through outer shaft 358 at or toward second end 354. An extension tube 370 is coupled with and radially outwardly projects from each outlet port 368. Formed between inner shaft 356 and outer shaft 358 and longitudinally running from inlet ports 366 to outlet ports 368 is a substantially cylindrical fluid inlet channel 372.

Figure 21:
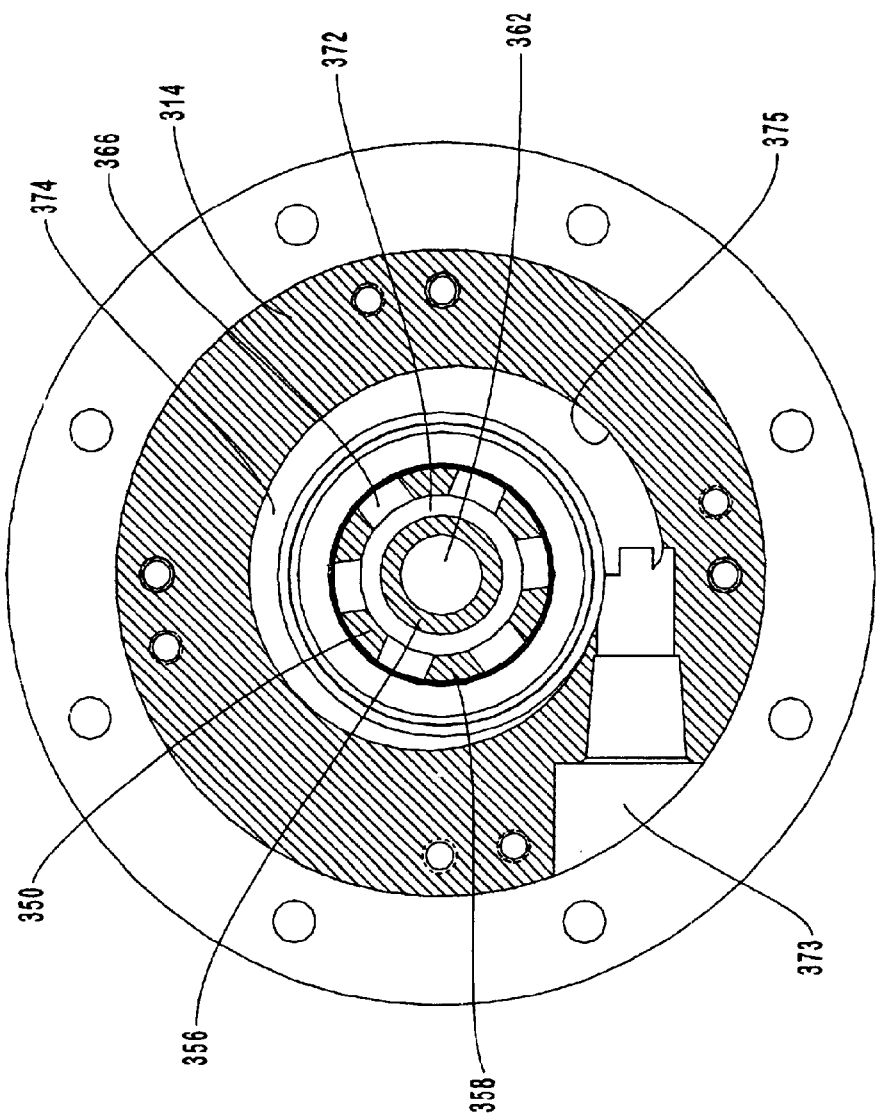
FIG. 21 is a cross sectional side view of the separator taken along line 21—21 in FIG. 19.

As depicted in FIG. 19, outlet ports 368 and extension tubes 370 are disposed within pressure vessel 316. In contrast, inlet ports 366 are in sealed fluid communication with a coupling port 373 formed on inlet housing 314. More specifically, as depicted in FIG. 21, inlet housing 314 bounds a cavity 374 that encircles input shaft 350 at inlet ports 366. As such, cavity 374 is in fluid communication with inlet ports 366. Cavity 374 has an interior sidewall 375 that spirals so as to radially constrict.

Coupling port 373 extends into inlet housing 314 and connects with cavity 374 at an orientation tangential to cavity 374. In turn, fluid inlet line 311, as previously discussed with regard to FIG. 18, is coupled with coupling port 373. Accordingly, as fluid enters through fluid inlet line 311, the fluid passes through cavity 374 and inlet ports 366 so as to enter fluid inlet channel 372. As a result of the tangential orientation of coupling port 373 and the spiral configuration of cavity 374, the fluid entering cavity 374 is forced to rotate within annular cavity 374 about rotational axis 466 of shaft assembly 322. The fluid is rotating in the same direction that shaft assembly 322 rotates. Although not required, this introduction of the fluid in a rotating orientation minimizes turbulent flow of the fluid passing into separator 300, thereby maximizing operating efficiency.

Returning to FIG. 20, similar to input shaft 350, shaft assembly 322 also includes a tubular output shaft 376. Output shaft 376 extends from a first end 378 to an opposing second end 380. Second end 380 corresponds to outlet end 326 of shaft assembly 322. First end 378 is securely disposed within outlet end 342 of manifold 336. Output shaft 376 has an interior surface 382 that bounds an effluent channel 384. Effluent channel 384 extends from a sealed end wall 386 (FIG. 22) at first end 378 to an open exit mouth 388 at second end 380. Furthermore, a plurality of radially spaced apart transfer tubes 400 extend in sealed fluid communication from the exterior of shaft assembly 322 to effluent channel 384 at first end 378.

As depicted in FIG. 19, transfer tubes 400 are disposed in open fluid communication within pressure vessel 316. In contrast, outlet mouth 388 is in sealed fluid communication with a coupling port 404 formed on outlet housing 315. In turn, coupling port 404 is fluid coupled with effluent line 348 as previously discussed with regard to FIG. 18. As such, fluid entering effluent channel 384 through transfer tubes 400, exits through outlet housing 315 and effluent line 348.

Returning to FIG. 20, output shaft 376 also comprises a tubular inner shaft 390 and a tubular outer shaft 392 encircling inner shaft 390. Inner shaft 390 and outer shaft 392 each extend between first end 378 and second end 380. First end 378 of inner shaft 390 is received within mouth 355 of manifold 336 so as to bias against end wall 353. An annular seal 359 extends between inner shaft 390 and mouth 355.

A plurality of radially spaced apart removal ports 394 extend through outer shaft 392 at or toward second end 380. Formed between inner shaft 390 and outer shaft 392 and longitudinally running from annular slot 357 formed on manifold 336 to removal ports 394 is an annular channel 395. Channel 395 and annular slot 357 combine to form a removal channel 396 that extends from each channel 346 on manifold 336 to removal ports 394.

As depicted in FIG. 19, removal ports 394 are in sealed fluid communication with a coupling port 402 formed on outlet housing 315. In one embodiment, coupling port 402 communicates with removal ports 394 in substantially the same fashion that inlet ports 366 fluid couple with coupling port 373, as discussed above with regard to FIG. 21, except that the fluid is flowing in the opposite direction. Coupling port 402 is fluid coupled to removal line 347, as discussed with regard to FIG. 18, such that fluid and/or particulate matter entering removal channel 396 exits through removal ports 394, coupling port 402 and removal line 347.

Figure 23:
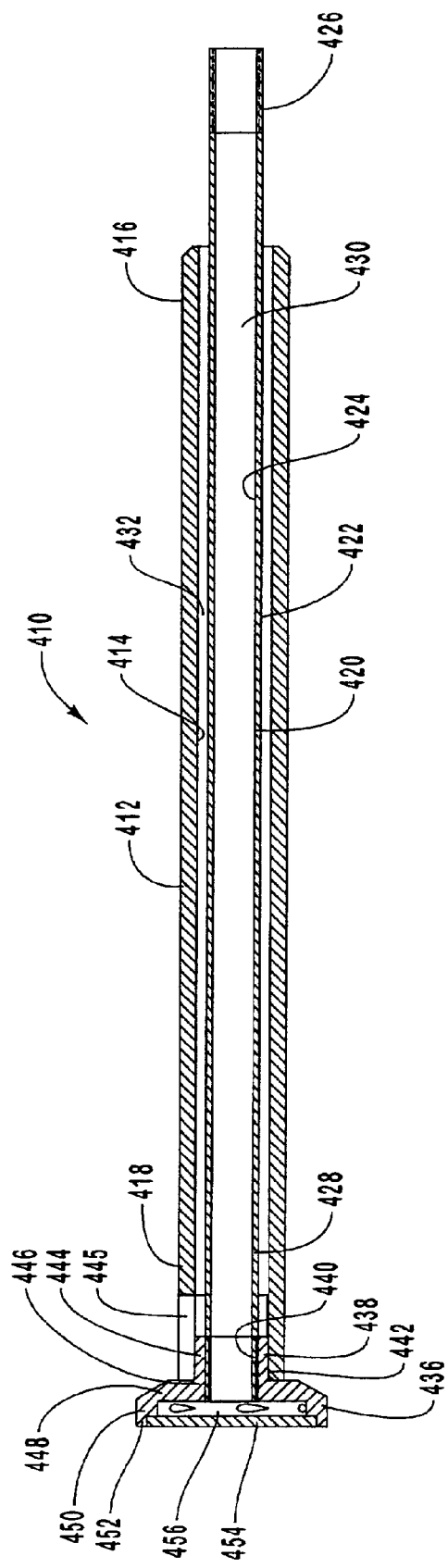
FIG. 23 is a cross sectional side view of an extraction tube of the separator shown in FIG. 22.

Depicted in FIG. 20, an extraction tube 410 is fluid coupled with and radially outwardly projects from each channel 346 of manifold 336. As depicted in FIG. 23, each extraction tube 410 comprises an outer tube 412 having an interior surface 414 extending between a first end 416 and an opposing second end 418. Disposed within outer tube 412 is an inner tube 420. Inner tube 420 has an exterior surface 422 and an interior surface 424 each extending between a first end 426 and an opposing second end 428. First end 426 of inner tube 420 projects past first end 416 of outer tube 412. Interior surface of 424 of inner tube 420 bounds a supply duct 430. A removal duct 432 is bound between interior surface 414 of outer tube 412 and exterior surface 422 of inner tube 420.

As depicted in FIG. 22, first end 426 of inner tube 420 of each extraction tube 410 is secured in fluid communication within third channel portion 345 of a corresponding channel 346 of manifold 336. As such, supply duct 430 is in fluid communication with compartment 339 of manifold 336 and fluid delivery channel 362. Furthermore, first end 416 of outer tube 412 of each extraction tube 410 is secured in fluid communication within first channel portion 345 of a corresponding channel 346 of manifold 336. As such, each removal duct 432 is in fluid communication with second channel portion 343 of a corresponding channel portion 346 which in turn is in fluid communication with effluent channel 384 by way of annular slot 357 in manifold 336.

Returning to FIG. 23, each extraction tube 410 also includes a nozzle 436. Nozzle 436 comprises a tubular stem 438 having an interior surface 440 and an exterior surface 442 each extending between a first end 444 and an opposing second end 446. Radially outwardly projecting from second end 446 of stem 438 is an annular flange 448. Second end 428 of inner tube 420 is securely disposed within stem 438 while second end 418 of outer tube 412 is securely disposed about the exterior of stem 438. A plurality of radially spaced apart slots 445 extend through outer tube 412 at second end 418. Slots 445 are in substantially parallel alignment with the rotational axis of outer tube 412. As a result, at least a portion of each slot 445 forms a channel extending from the exterior to removal duct 432. In one embodiment, each slot 445 is oriented so as to tangentially intersect with removal duct 432.

An annular sidewall 450 forwardly projects from the outer edge of flange 448. In turn, an annular lip 452 forwardly projects from the terminal end of sidewall 450. Secured inside of annular lip 452 so as to bias against sidewall 450 is an end cap 454. In this configuration, a disk shaped compartment 456 is encircled by sidewall 448 and bounded between end cap 454 and flange 448. Compartment 456 is in fluid communication with supply duct 430.

Figure 24:
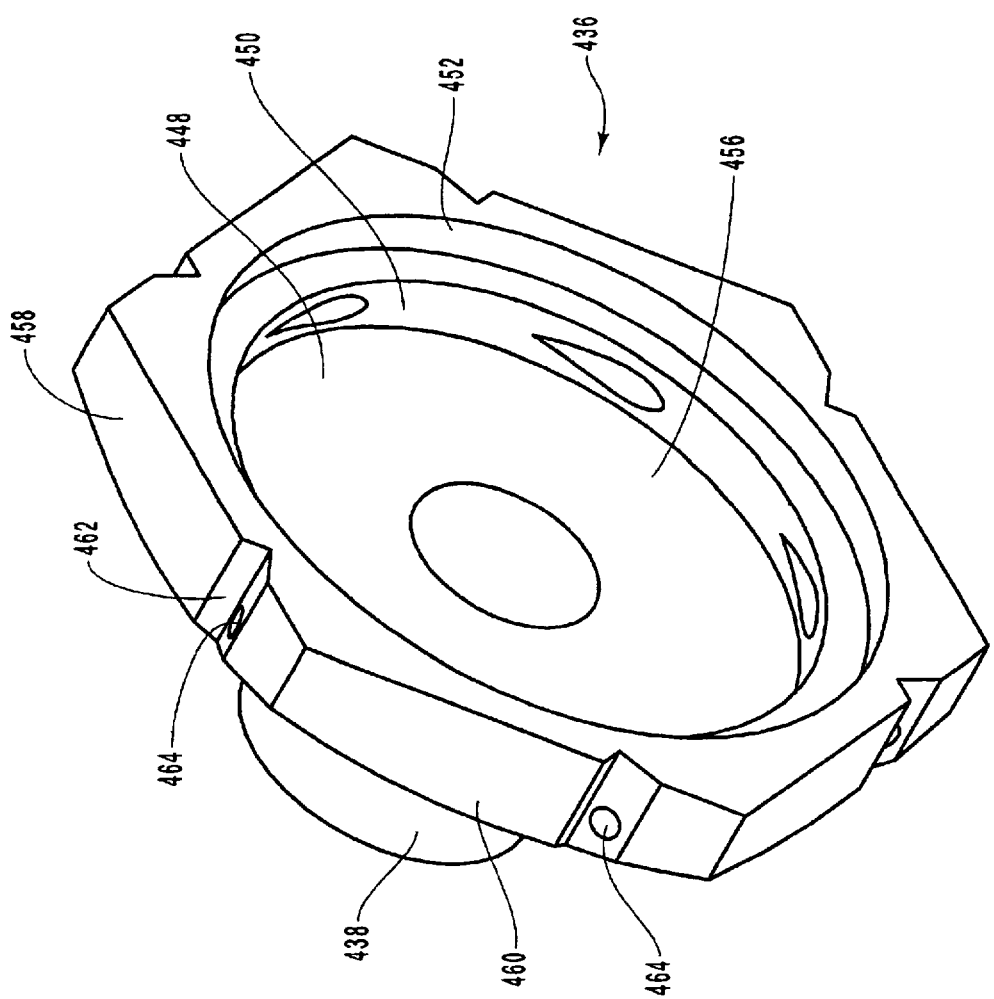
FIG. 24 is a perspective view of a nozzle of the extraction tube shown in FIG. 23.

Depicted in FIG. 24, sidewall 450 and lip 452 share a common outer face 458. Outer face 458 comprises six flat faces 460 each having a notch 462 formed thereon. A flush port 464 linearly extends from each notch 462 to compartment 456 by passing through sidewall 450. Each flush port 464 is configured to intersect tangentially with interior surface 451 of sidewall 450. As a result, fluid exiting through flush ports 464 exits at a generally tangential orientation to a radial arc from the center of nozzle 436. This is in contrast to the fluid exiting radially from flush ports 464. In view of the forgoing, fluid traveling down supply duct 430 passes through compartment 456 and out through flush ports 464. The fluid can then enter removal duct 432 through slots 445.

As illustrated in FIG. 22, nozzle 436 is disposed adjacent to or directly against the interior of wall 468 of pressure vessel 316 at equator 474. As will be discussed below in greater detail, nozzle 436 can be further spaced radially inward from wall 468 but in some embodiments such positioning may be less efficient in removing particulate matter.

As with pressure vessel 60, pressure vessel 316 is also configured with a plurality of fins and discs for channeling fluid through vessel 316. An annular first disc 478 encircles input shaft 350, and is secured, such as by pins, bolts, welding and the like, to inlet end 340 of manifold 336. Similarly, an annular second disc 480 encircles output shaft 376 and is secured to outlet end 342 of manifold 336. Each of discs 478 and 480 is positioned perpendicular to rotational axis 466.

Figure 25:
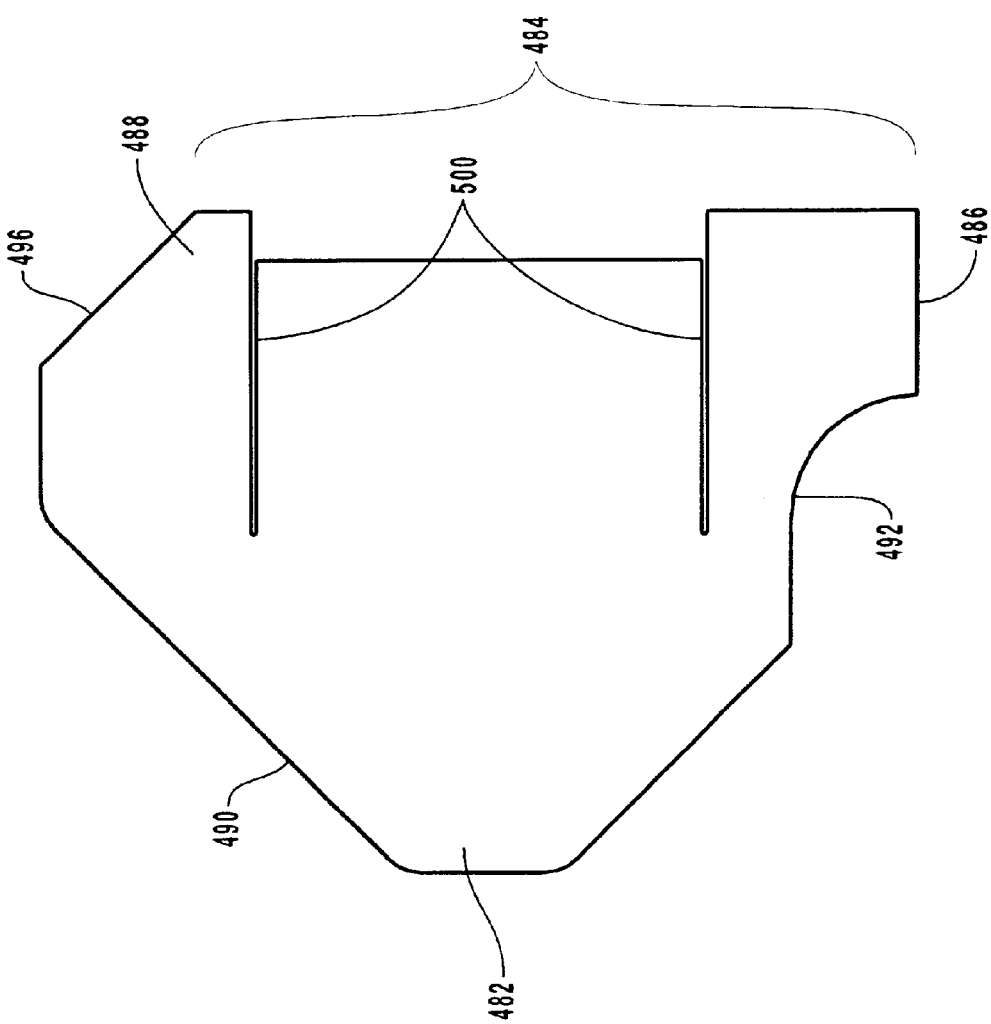
FIG. 25 is a plan view of a fin of the separator shown in FIG. 22.

Intersecting with discs 478 and 480 are a plurality of fins 482. As depicted in FIG. 25, each fin 482 comprises a inside edge 484 that extends between a first end 486 and an opposing second end 488 and a remaining perimeter edge 490. Inside edge 484 is configured to complementary fit over manifold 336 and is configured to run in parallel alignment with rotational axis 466. Perimeter edge 490 is configured substantially complementary to interior surface 470 of pressure vessel 316.

As depicted in FIGS. 22 and 25, perimeter edge 490 comprises a first cut out portion 492 at first end 486. First cut out portion 492 is formed radially out from the terminal end of extension tubes 370. As a result, an annular inflow equalizing channel 494 circles shaft assembly 322 within chamber 472 and is partially bounded between first cutout portion 492 of each fin 482 and interior surface 470 of pressure vessel 316.

Perimeter edge 490 of each fin 480 also comprises a second cut out portion 496 at second end 488. Second cut out portion 496 is formed radially out from transfer tubes 400. As a result, an annular outflow equalizing channel 498 circles shaft assembly 322 within chamber 472 and is partially bounded by second cutout portion 496 of each fin 482, interior surface 470 of pressure vessel 316, and output shaft 376.

Figure 26:
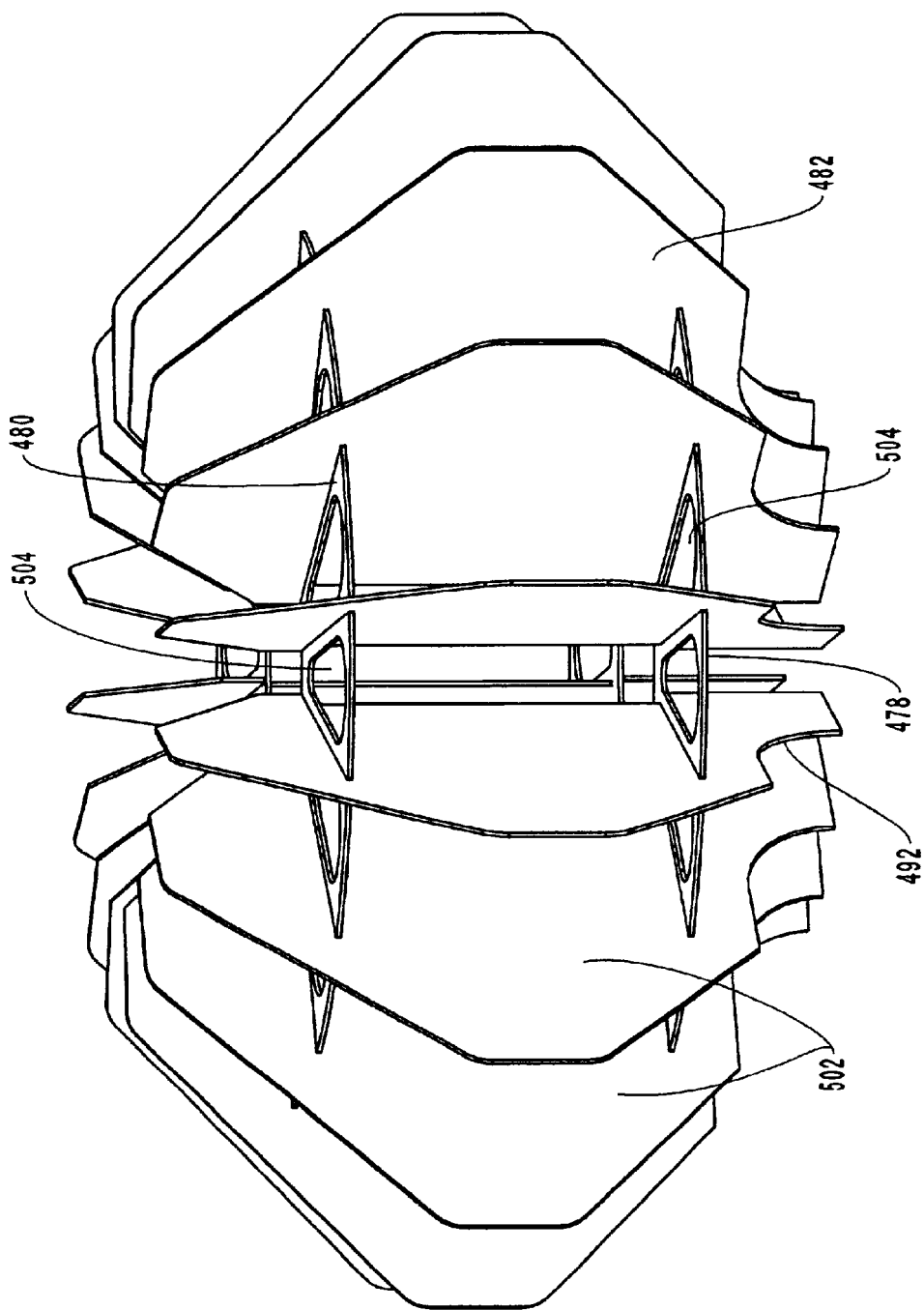
FIG. 26 is a perspective view of a fin assembly of the separator shown in FIG. 19.

Extending from inside edge 484 of each fin 482 are a pair of spaced apart disc receive slots 500. Complementary radially spaced apart slots are also formed on the outside edge of discs 478 and 480 so, as depicted in FIG. 26, fins 482 and discs 478, 480 can be interlocked together by coupling the slot. This is the same form of interlocking as previously discussed with regard to that fins and discs in FIG. 5. Fins 482 are thus secured to shaft assembly 322 and extend in parallel alignment with rotational axis 466. Bounded between each adjacent pair of fins 482 and extending between inlet end 318 to outlet end 320 is a flow channel 502.

As further depicted in FIGS. 22 and 26, where separator 300 is primarily being used separate fluids of different densities, such as oil and water, discs 478 and 480 are form with openings 504 that extend therethrough in alignment with each fluid channel 502. Openings 504 allow the fluid to flow through the discs as opposing to having to flow around them. In this embodiment, discs 478 and 480 primarily function as supports for fins 482.

Depending on its intended use, the operation of separator 300 is similar to the operation of separator 10 and separator 244 as previously discussed. As such, the operating parameters previously discussed with regard to separators 10 and 244 are also applicable to separator 300. Returning to FIG. 18, during operation motor 330 is activated causing rotation of pressure vessel 316 about rotational axis 466. Shaft assembly 322, extraction tubes 410, and fins 482 with associated discs rotate concurrently with pressure vessel 316. A feed stream 506 is feed into separator 300 through inlet line 311. Feed stream 506 is preferably pressurized, such as by pump 80 in FIG. 2, so that feed stream 506 is maintained under a predefined pressure within pressure vessel 316 during operation of separator 300.

With discs 478 and 480 having openings 504 therein (FIG. 26), separator 300 is configured to primarily operate as a liquid-liquid separator. As such, for purposes of illustration feed stream 506 comprises at least two immiscible liquids of different density. The two liquids are again referred to as heavy component 241 and light component 243. The operation of separator 300 will be discussed with regard to separating the two components. Although separating of the two components can also facilitate at least some removal of particulate matter from light component 243, a later embodiment will be discussed with regard to operating separator 300 has a solid-liquid separator for removing particulate matter.

As illustrated in FIG. 19, feed stream 506 passes from inlet line 311 (FIG. 18) into coupling port 373 of inlet housing 314. As previously discussed with regard to FIG. 21, feed stream 506 is forced to spin within cavity 374 so as to at least being matching the rotation of feed stream 506 with the rotation of shaft assembly 322. Spinning feed stream 506 next passes through inlet ports 366 and into fluid inlet channel 372 of input shaft 350. Feed stream 506 exits inlet channel 372 through extension tubes 370, thereby entering chamber 472 of pressure vessel 316. Although not required, in one embodiment the feed stream is now rotating at substantially the same speed as pressure vessel 316. The use of extension tubes 370 which radially outwardly extend from shaft assembly 322 forces inlet steam 506 exiting therefrom to be subject to at least a portion of the gravitational force produced by separator 300. In alternative embodiments, extension tubes 370 can be removed.

As depicted in FIG. 22, upon entering pressure vessel 316 the centrifugal force imposed due to the rotation of pressure vessel 316 pushes the stream radially outwardly towards wall 468. As the stream enters pressure vessel 316, it enters one of the flow channels 502 (FIG. 26) and proceeds to fill vessel 316. As previously discussed, flow channels 502 help to eliminate the Coriolis effect. Although an extension tube 370 can be provided for each discrete flow channel 502, inflow equalizing channel 494 allows fluid communication at the entrance of flow channels 502, thereby helping to ensure a common fluid level and flow rate through each flow channel 502. In alternative embodiments, inflow equalizing channel 494 can be eliminated.

As feed stream 506 travels within flow channels 502 toward transfer tubes 400, the stream is subjected to the tremendous centrifugal forces imposed on it due to the rotation of vessel 316. Thus, the more dense component of the stream flows radially outwardly while the less dense component flows radially inwardly toward rotational axis 466. A boundary line 508, disposed parallel to rotational axis 320, is thus formed within chamber 472 denoting the separation between heavy component 241 and light component 243.

Light component 243 continues to travel within flow channels 502 to transfer tubes 400. The formation of outflow equalizing channel 498 allows fluid communication between each stream of light component 243 leaving its corresponding flow channel 502, thereby helping to ensure a common inflow through each of transfer tubes 400. As a result, there can be fewer transfer tubes 400 than flow channels 502. Alternatively, a transfer tube 400 can be provided for each flow channel 502, thereby eliminating the need for outflow equalizing channel 498.

Returning to FIG. 19, light component 243 enters effluent channel 384 through transfer tubes 400. Lighter component 243 subsequently exits effluent channel 384 and separator 300 through effluent line 348 (FIG. 18) as either a final product or for subsequent processing.

Returning back to FIG. 22, heavy component 241 is removed from vessel 316 by being drawn into removal duct 432 of each extraction tube 410 through slots 445 at the end thereof. In this regard, slots 445 can be positioned at any location radially out from boundary line 508. Heavy component 241 travels radially inward along removal ducts 432 where it subsequently passes through second channel portion 343 and into removal channel 396 by way of annular slot 357. In turn, heavy component 241 exits removal channel 396 and separator 300 by way of removal ports 394 and removal line 347. The removal of heavy component 241 and light component 243 is controlled using one of the control systems and methods as previously discussed with regard to FIGS. 13–14 so that boundary line 508 is maintained at a desired location or within a desired range within vessel 316.

In one embodiment, it is appreciated that an extraction tube 410 can be provided for each flow channel 502. In an alternative embodiment, an extraction tube 410 can be provided in every other flow channel 502 or in any other desired placement. Where an extraction tube 410 is not provided in each channel 502, some form of opening or gap is provided at the separating fin so that fluid communication of the heavy component 241 is provided between two or more flow channels 502. Such openings or gaps can be formed by underflow passage 190 as previously discussed.

It is appreciated that most fluids for which separation of the components is desired will also include some form of particulate matter. The particulate matter which is initially suspended within feed stream 506 enters flow channels 502 where under the gravitational force produced by separator 300 is forced to the interior of wall 468 primarily about equator 474. Periodically the collected particulate matter is removed from vessel to prevent an overbuild up within vessel 316.

By way of example, at periodic intervals valves 317 and 351 on fluid inlet line 311 and effluent line 348, respectively, are closed. Subsequently, valves 319 and 349 on delivery line 313 and removal line 347, respectively, are opened. Next, with vessel 316 still rotating, a cleaning stream 510 is pumped into delivery line 313. Cleaning stream 510 travels down delivery channel 362 where is subsequently passes into supply duct 430 of each extraction tube 410. Finally, cleaning stream 510 passes through flush ports 464 into chamber 472 of pressure vessel 316. As a result of the orientation of flush ports 464, the exiting cleaning stream 510 produces a swirling vortex around nozzle 436. The swirling vortex resuspends the particulate matter that has caked or otherwise deposited against the interior of wall 468. Simultaneously with delivering cleaning stream 510 into chamber 472, heavier component 241 now having the particulate matter suspended therein is drawn out through removal ducts 432 in extraction tubes 410 as previously discussed.

Once a desired amount particulate matter and heavy component 241 is removed, valves 319 and 349 on delivery line 313 and removal line 347, respectively, are closed. Valves 317 and 351 on fluid inlet line 311 and effluent line 348, respectively, continue to remain closed for a sufficient period of time to enable the resuspended solids to again settle against the interior of wall 468 as a result of the rotation of pressure vessel 316. Although not required, this act helps to ensure that resuspended solids are not dawn out with the lighter component. Once the solids have again settled, valves 317 and 351 are opened and the process is continued. In yet another method of operation, it is appreciated that feed stream 506 and cleaning stream 510 can feed simultaneously for concurrently removing both the heavier component and the lighter component.

In alternative embodiments, it is appreciated that extraction tube 410 can have a variety of different configurations. For example, flush ports 464 can be positioned at any orientation including radially outward. Furthermore, flush ports 464 can be positioned to exit through end cap 454. Any of a number of other configurations for nozzle 436 in which fluid can be ejected therefrom for resuspension of the particulate matter can also be used.

Figure 27:
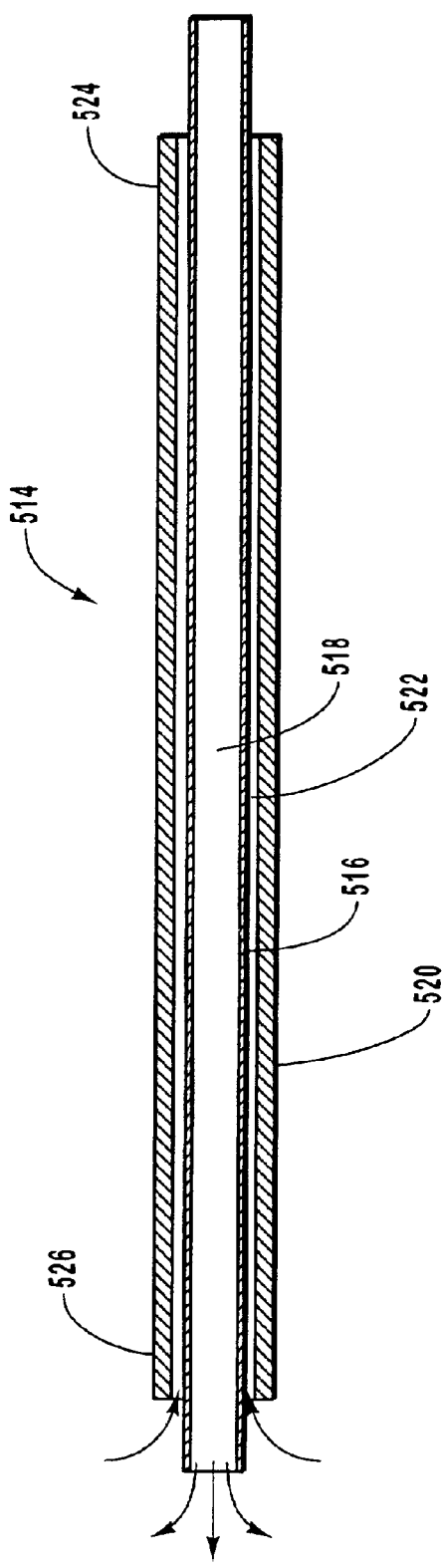
FIG. 27 is a cross sectional side view of an alternative embodiment of the extraction tube shown in FIG. 24.

In yet another embodiment as depicted in FIG. 27, an extraction tube 514 is shown without the use of nozzle 436. Extraction tube 514 has an inner tube 516 bounding a supply duct 518 and a surrounding outer tube 520. A removal duct 522 is bound between inner tube 516 and outer tube 520. Each of tubes 516 and 518 extends between a first end 524 and an opposing second end 526. First end 524 of extraction tube 514 is coupled with manifold 316 in substantially the same way as extraction tube 410.

Second end 526 of each of tubes 516 and 520 are openly exposed as opposed to being coupled with nozzle 436. As such, fluid simply exits through supply duct 518 at second end 526 to resuspend the solids settled against pressure vessel 316 while the heavier component with the resuspended solids therein enters into removal duct 522 at second end 526. In this embodiment, outer tube 520 can be formed without slots 445. If desired, however, a support collar (not shown) having holes extending therethrough can be positioned between inner tube 516 and outer tube 520 to maintain spacing between the tubes. It is also appreciated that the system can be manipulated so that cleaning stream 510 flows out of removal duct 522 into pressure vessel 316 while the heavy component 241 with the resuspended particulate matter is removed through supply duct 518.

Figure 28:
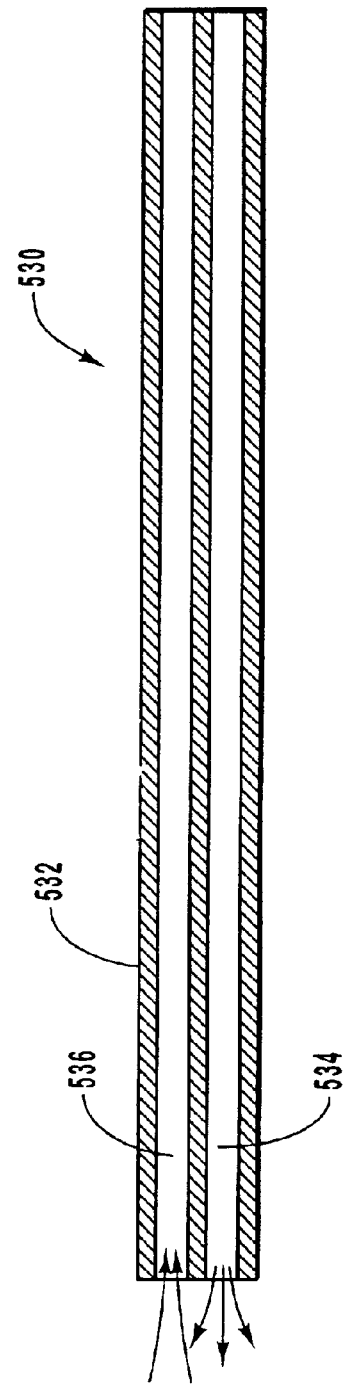
FIG. 28 is a cross sectional side view of another alternative embodiment of the extraction tube shown in FIG. 24.

Depicted in FIG. 28 is another embodiment of an extraction tube 530. Extraction tube 530 comprises an integral tube 532 that bounds a supply duct 534 and an adjacently disposed removal duct 536. It is appreciated that one skilled in the art based on the teaching herein could modify manifold 336 to couple with a first end of extraction tube 530 so that supply duct 534 communicates with delivery channel 362 and removal duct 536 communicates with removal channel 396. Alternatively extraction tube 530 can also comprise two separate tubes, one that bounds supply duct 534 and one that bounds removal duct 536.

Further alternative embodiments of extraction tubes are disclosed in U.S. Pat. No. 5,853,266, entitled Fluidising Apparatus which drawings thereof and disclosure set forth in the Detailed Description of the Invention are incorporated herein by specific reference. Various forms of extraction tubes can also be obtained from Merpro Limited out of Nailsea, Bristol, United Kingdom.

Figure 29:
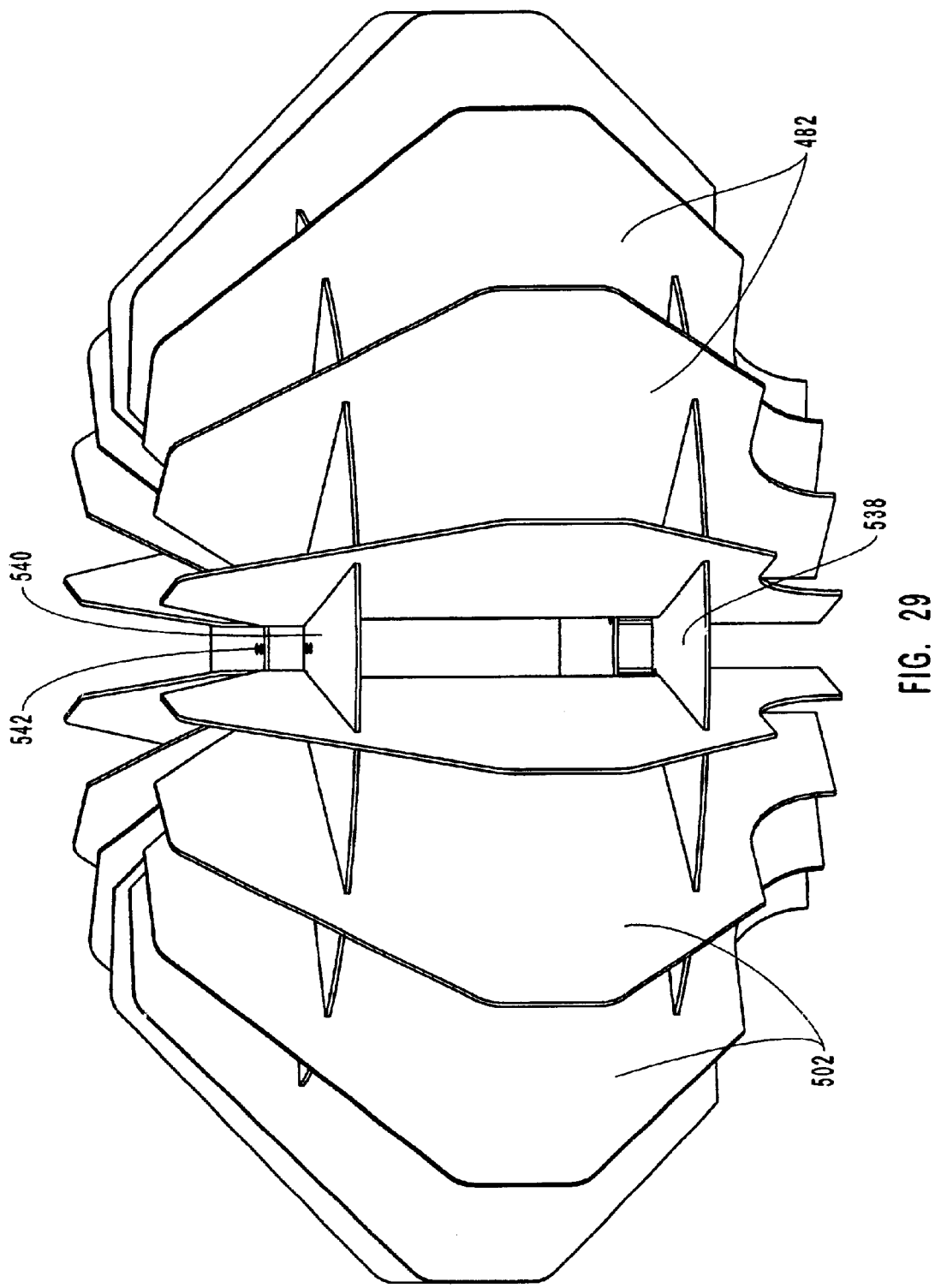
FIG. 29 is a perspective view of a fin assembly of the separator shown in FIG. 19 using solid discs.

Although the above described embodiment of separator 300 can be used for the removal of some particulate matter, the configuration is primarily designed for separation of mixed liquids, i.e., separating oil and water. As previously discussed, however, separator 300 can also function primarily as a solid-liquid separator. Under this embodiment it is desirable to maximize the application of the centrifugal force on the particulate matter within the fluid. Accordingly, depicted in FIG. 29, a fin assembly is shown wherein each of the fins 482 interlock with a first disc 538 and a second disc 540 in substantially the same way that discs 478 and 480 interlocked with fins 482 in FIG. 25. One distinction between discs 538, 540 and discs 478, 480 is that discs 538, 540 do not have large openings 504 extending therethrough. In one embodiment, however, one or more small gas ports 542 do extend through each of discs 538 and 540 adjacent to their inside perimeter edge.

Turning to FIG. 22, assuming that discs 478 and 480 were replaced with discs 538 and 540, respectively, the fluid entering chamber 472 of pressure vessel 316 through extension tubes 370 is forced to initially travel around the outer perimeter of disc 538. In so doing, the fluid and particulate matter therein are subject to a greater centrifugal force than if they had simply passed through openings 504. The increased centrifugal force results in a higher concentration of the particulate matter settling against interior surface 470 of pressure vessel 316 primarily about equator 474. The clarified liquid is removed from pressure vessel 316 through transfer tubes 400 as previously discussed while the solids are periodically resuspended and removed through extraction tube 410 or the alternatives discussed therewith as also previously discussed. In one embodiment separator 300 can be operated using the method and valve assembly as discussed with regard to solid-liquid separator 10.

Any gas which enters vessel 316 passes through gas ports 542 and exits with the clarified liquid. Alternatively, the gas can be removed from the feed stream before it enters the separator by passing the stream through a commercially available needle valve or other device designed to remove gases from fluid streams. In this embodiment, gas ports 542 are note required.

One of the benefits of having disc 540 solid, thereby requiring all of the fluid to pass around the outer perimeter thereof, is that it extends the retention time of the fluid within pressure vessel 316. In general, the longer the retention time the more particulate matter is separated from the fluid. In alternative embodiments, however, first disc 538 can be solid while second disc 540 can have openings 540 formed therein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of accomplishing separation of a multiple-component fluid mixture comprising:

feeding the fluid mixture into a chamber of a vessel through an inlet channel, the chamber being at least partially bounded by a peripheral wall and the chamber also communicating with an outlet channel, the fluid mixture including a heavy component and a light component;

rotating the vessel about a rotational axis extending through the vessel such that the heavy component collects toward at least a portion of the peripheral wall of the vessel radially outward from the rotational axis and the light component collects toward the rotational axis, a plurality of spaced apart fins being disposed within the chamber, each fin projecting from toward the rotational axis to toward the peripheral wall, at least a portion of the fluid mixture being disposed between the plurality of fins during rotation of the vessel, a disc outwardly projecting from toward the rotational axis to toward the peripheral wall, the disc intersecting with each of the plurality of fins, the fluid mixture being feed into the chamber such that fluid mixture is forced to travel around an outer perimeter of the disc;

removing the light component through the outlet channel; and removing the heavy component through a conduit disposed within the chamber, at least a portion of the conduit extending from toward the peripheral wall of the chamber to toward the rotational axis.

2. A method according to claim 1, further comprises:

removing the light component substantially continuously from the rotating vessel; and removing the heavy component intermittently from the rotating vessel.

3. A method according to claim 1, further comprises:

removing the light component substantially continuously from the rotating vessel; and removing the heavy component substantially continuously from the rotating vessel.

4. A method according to claim 1, wherein the act of feeding the fluid mixture into the chamber includes the light component comprising a fluid and the heavy component comprising solid particulate matter.

5. A method according to claim 4, wherein at least a portion of the particulate matter settles against the peripheral wall of the vessel due to the rotation of the vessel, the method further comprising feeding a removal stream of fluid into the rotating vessel such that the removal stream initially mixes with the fluid light component at or adjacent to the peripheral wall, the removal stream resuspending the particulate matter settled against the peripheral wall into the fluid light component.

6. A method according to claim 1, further comprising pressurizing the fluid mixture within the chamber.

7. A method according to claim 1, wherein the fluid mixture is pressurized within the chamber in a range between about 75 psi to about 125 psi.

8. A method according to claim 1, further comprising rotating the fluid within the inlet channel in the same direction that the vessel rotates prior to feeding the fluid mixture into the vessel.

9. A method according to claim 1, wherein the fins bound an area between each adjacent fin, an opening being formed in each fin such that an annular fluid equalizing channel provides fluid communication between each of the areas bounded by the fins, the fluid mixture being feed into the chamber of the vessel such that at least a portion of the fluid travels within the fluid equalizing channel.

10. A method according to claim 1, wherein at least a portion of the inlet channel, outlet channel, and conduit encircle a corresponding length of the rotational axis.

11. A method according to claim 1, wherein the act of feeding a fluid mixture comprises feeding a mixture of oil which corresponds to the light component and water which corresponds to the heavy component into the chamber of the vessel.

12. A method according to claim 1, wherein the fluid mixture comprises a heavy fluid component, a light fluid component, and particulate matter, at least a portion of the particulate matter settling against the peripheral wall of the vessel due to the rotation of the vessel, the method further comprising feeding a removal stream of fluid into the rotating vessel such that the removal stream initially mixes with the heavy fluid component at or adjacent to the peripheral wall, the removal stream resuspending the particulate matter settled against the peripheral wall into the heavy fluid component.

13. A method according to claim 1, wherein the fins substantially prevent the fluid mixture between adjacent fins from swirling around the rotational axis.

14. A method according to claim 1, wherein a discrete fluid channel is bounded between each adjacent fin.

15. A method according to claim 1, wherein rotating the vessel comprises directly rotating a shaft extending along the rotational axis, the vessel being connected to the shaft.

16. A method according to claim 1, wherein removal of the light component comprises passing the light component through a passageway that either encircles or extends along a portion of the rotational axis.

17. A method according to claim 1, wherein each fin comprises a substantially flat plate.

18. A method of accomplishing separation of a multiple-component fluid mixture comprising:
    feeding the fluid mixture into a chamber of a vessel through an inlet disposed at a first end of the vessel, the fluid mixture including a heavy component and a light component, the vessel having an opposing second end with an first outlet disposed thereat and a peripheral wall extending between the first end and the opposing second end;
    rotating the vessel about a rotational axis extending through the vessel such that the heavy component collects toward at least a portion the peripheral wall of the vessel radially outward from the rotational axis and the lighter component collects toward the rotational axis, a plurality of spaced apart fins being disposed within the chamber, the fins bounding a plurality of fluid channels that extend at least partially between the inlet and the first outlet;
    removing the light component through the first outlet; and
    removing the heavy component through a plurality of extraction tubes, each extraction tube being disposed within a corresponding fluid channel and extending from toward the rotational axis to toward the peripheral wall, each of the extraction tubes fluid communicating external of the vessel.

19. A method as recited in claim 18, wherein at least one of the extraction tubes bounds a second outlet that is disposed at a distance from the rotational axis, the first outlet being disposed closer to the rotational axis than the second outlet such that during use a fluid boundary line is formed between the first outlet and the second outlet.

20. A method according to claim 18, further comprises:
    removing the heavy component substantially continuously from the rotating vessel; and
    removing the light component intermittently from the rotating vessel.

21. A method according to claim 18, wherein the act of feeding the fluid mixture into the chamber includes the light component comprising a fluid and the heavy component comprising a fluid, solid particulate matter, or combinations thereof.

22. A method according to claim 18, further comprising pressurizing the fluid mixture within the chamber in a range between about 15 psi to about 600 psi.

23. A method according to claim 18, wherein a disc outwardly projects from toward the rotational axis to toward the peripheral wall, the disc intersecting with each of the plurality of fins, the fluid mixture being feed into the chamber such that fluid mixture is forced to travel around an outer perimeter of the disc.

24. A method according to claim 18, wherein a disc outwardly projects from toward the rotational axis to toward the peripheral wall, the disc intersecting with each of the plurality of fins and the disc having a plurality of openings extending therethrough, the fluid mixture being feed into the chamber such that at least a portion of fluid mixture passes through the openings in the disc.

25. A method according to claim 18, wherein an opening is formed in each fin such that an annular fluid equalizing channel provides fluid communication between each of the areas bounded by the fins, the fluid mixture being feed into the chamber of the vessel such that at least a portion of the fluid travels within the fluid equalizing channel.

26. A method according to claim 18, wherein the inlet and the first outlet of the vessel encircle the rotational axis or have the rotational axis extending therethrough.

27. A method for separating particulate matter from a fluid in which the particulate matter is suspended, the method comprising:
    feeding a fluid containing a particulate matter into a chamber of a vessel through an inlet, the chamber being at least partially bounded by a peripheral wall and the chamber also communicating with an outlet;
    rotating the vessel about a rotational axis extending through the vessel such that at least a portion of the particulate matter settles out of the fluid and against at least a portion of the peripheral wall of the vessel;
    delivering a stream of removal fluid into the rotating vessel at or adjacent to the peripheral wall such that delivery of the removal stream into the vessel causes at least a portion of the particulate matter settled against the peripheral wall to resuspend within the fluid;
    removing at least a portion of the fluid having the resuspended particulate matter therein from the vessel through an extraction tube, the extraction tube having an opening to receive the fluid at or adjacent to the peripheral wall; and
    removing through the outlet of the vessel the fluid from which the particulate material has settled out.

28. A method according to claim 27, wherein the act of feeding includes the fluid comprising a heavy fluid component and a light fluid component.

29. A method according to claim 27, wherein the removal fluid is delivered to the vessel through a supply duct formed in the extraction tube and the fluid having the resuspended particulate matter therein is removed through a removal duct in the extraction tube.

30. A method according to claim 29, wherein one of the supply duct and removal duct is disposed within the other.

31. A method according to claim 27, wherein the removal fluid is delivered to the vessel and the fluid having the resuspended particulate matter therein is removed from the vessel through the same duct formed in the extraction tube.

32. A method according to claim 27, further comprising pressurizing the fluid within the chamber in a range between about 15 psi to about 600 psi.

33. A method according to claim 27, wherein a plurality of spaced apart fins are disposed within the chamber of the vessel, the fins bounding a plurality of fluid channels that extend between the inlet and the outlet, the fluid being feed into the chamber of the vessel such that at least a portion of the fluid passes through the fluid channels.

34. A method according to claim 33, wherein a disc outwardly projects from toward the rotational axis to toward the peripheral wall, the disc intersecting with each of the plurality of fins, the fluid being feed into the chamber such that fluid is forced to travel around an outer perimeter of the disc.

35. A method according to claim 33, wherein a disc outwardly projects from toward the rotational axis to toward the peripheral wall, the disc intersecting with each of the plurality of fins and the disc having a plurality of openings extending therethrough, the fluid being feed into the chamber such that at least a portion of fluid passes through the openings in the disc.

36. A method according to claim 33, wherein an opening is formed in each fin such that an annular fluid equalizing channel provides fluid communication between each of the areas bounded by the fins, the fluid being feed into the chamber of the vessel such that at least a portion of the fluid travels within the fluid equalizing channel.

37. A method according to claim 27, wherein the inlet and the outlet of the vessel encircle the rotational axis or have the rotational axis extending therethrough.

38. A method for separating particulate matter from a fluid in which the particulate matter is suspended, the method comprising:
feeding into a chamber of a vessel through an inlet in a substantially continuous fashion a fluid containing a particulate matter, the chamber being at least partially bounded by a peripheral wall and the chamber also communicating with an outlet;
rotating the vessel about a rotational axis extending through the vessel such that at least a portion of the particulate matter settles out of the fluid and against at least a portion of the peripheral wall of the vessel;
removing through the outlet of the vessel in a substantially continuous fashion the fluid from which the particulate material has settled out;
temporarily stopping the flow of the fluid through the inlet and the outlet of the vessel;
during the period in which the flow of fluid through the inlet and outlet is stopped, delivering a stream of removal fluid into the rotating vessel at or adjacent to the peripheral wall such that delivery of the removal stream into the vessel causes at least a portion of particulate matter settled against the peripheral wall to resuspend within the fluid contained within the vessel;
removing at least a portion of the fluid having the resuspended particulate matter therein from the vessel; and
once the at least a portion of the fluid having the resuspended particulate matter therein is removed from the vessel, reinitiating the flow of the fluid through the inlet and outlet of the vessel.

39. A method according to claim 38, wherein the removal fluid is delivered through a plurality of extraction tubes extending from toward the rotational axis to toward the peripheral wall, the extraction tubes being in communication with a source of removal fluid.

40. A method according to claim 38, wherein the fluid having the resuspended particulate matter therein is removed from the vessel through a plurality of extraction tubes, at least a portion of each of the extraction tubes extending from toward the rotational axis to toward the peripheral wall.

41. A method according to claim 38, wherein the act of feeding includes the fluid comprising a heavy fluid component and a light fluid component.

42. A method according to claim 38, further comprising pressurizing the fluid within the chamber in a range between about 15 psi to about 600 psi.

43. A method according to claim 38, wherein a plurality of spaced apart fins are disposed within the chamber of the vessel, the fins bounding a plurality of fluid channels that extend between the inlet and the outlet, the fluid being feed into the chamber of the vessel such that at least a portion of the fluid passes through the fluid channels.

44. A method according to claim 43, wherein a disc outwardly projects from toward the rotational axis to toward the peripheral wall, the disc intersecting with each of the plurality of fins, the fluid being feed into the chamber such that fluid is forced to travel around an outer perimeter of the disc.

45. A method according to claim 43, wherein a disc outwardly projects from toward the rotational axis to toward the peripheral wall, the disc intersecting with each of the plurality of fins and the disc having a plurality of openings extending therethrough, the fluid being feed into the chamber such that at least a portion of fluid passes through the openings in the disc.

46. A method according to claim 43, wherein an opening is formed in each fin such that an annular fluid equalizing channel provides fluid communication between each of the areas bounded by the fins, the fluid being feed into the chamber of the vessel such that at least a portion of the fluid travels within the fluid equalizing channel.

47. A method according to claim 38, wherein the inlet and the outlet of the vessel encircle the rotational axis or have the rotational axis extending therethrough.

48. A method of accomplishing separation of a multiple-component fluid mixture comprising:
feeding the fluid mixture into a chamber of a vessel through an inlet channel, the chamber being at least partially bounded by a peripheral wall and the chamber also communicating with an outlet channel, the fluid mixture including a heavy component and a light component;
rotating the vessel about a rotational axis extending through the vessel such that the heavy component collects toward at least a portion of the peripheral wall of the vessel radially outward from the rotational axis and the light component collects toward the rotational axis, a plurality of spaced apart fins being disposed within the chamber, each fin projecting from toward the rotational axis to toward the peripheral wall, at least a portion of the fluid mixture being disposed between the plurality of fins during rotation of the vessel, a disc outwardly projecting from toward the rotational axis to toward the peripheral wall, the disc intersecting with each of the plurality of fins and the disc having a plurality of openings extending therethrough, the fluid mixture being feed into the chamber such that at least a portion of fluid mixture passes through the openings in the disc;
removing the light component through the outlet channel; and
removing the heavy component through a conduit disposed within the chamber, the conduit extending from the heavy component toward the rotational axis and out of the vessel.

49. A method according to claim 48, wherein the fins substantially prevent the fluid mixture between adjacent fins from swirling around the rotational axis.

50. A method according to claim 48, wherein a discrete fluid channel is bounded between each adjacent fin.

51. A method according to claim 48, wherein rotating the vessel comprises directly rotating a shaft extending along the rotational axis, the vessel being connected to the shaft.

52. A method according to claim 48, wherein removal of the light component comprises passing the light component through a passageway that either encircles or extends along a portion of the rotational axis.

53. A method according to claim 48, wherein each fin comprises a substantially flat plate.

54. A method according to claim 48, wherein the fluid mixture comprises a heavy fluid component, a light fluid component, and particulate matter, at least a portion of the particulate matter settling against the peripheral wall of the vessel due to the rotation of the vessel, the method further comprising feeding a removal stream of fluid into the rotating vessel such that the removal stream initially mixes with the heavy fluid component at or adjacent to the peripheral wall, the removal stream resuspending the particulate matter settled against the peripheral wall into the heavy fluid component.

* * * * *

UNITED STATES PATENT AND TRADEMARK OFFICE
CERTIFICATE OF CORRECTION

PATENT NO. : 6,719,681 B2
DATED : April 13, 2004
INVENTOR(S) : Kevin E. Collier

It is certified that error appears in the above-identified patent and that said Letters Patent is hereby corrected as shown below:

Title page,
Item [56], References Cited, U.S. PATENT DOCUMENTS, after "699,217 A 5/1902" change "Mccomack" to -- McCornack --; and remove "690,833 A 7/1902" and replace with -- 690,883 A 1/1902 --; and remove "1,669,379 A 1/1928" and replace with -- 1,699,379 A 1/1929 --

Column 3,
Line 61, change "initially feed" to -- initially fed --

Column 4,
Line 18, change "that is feed" to -- that is fed --

Column 10,
Line 10, insert -- with -- before "rotational axis 90"
Line 21, change "FIG. the" to -- FIG. 8, the --

Column 12,
Line 64, change "fed stream 38" to -- feed stream 38 --

Column 13,
Line 50, change "be feed" to -- be fed --

Column 14,
Line 67, change "at then end" to -- at the end --

Column 15,
Line 1, change "efficiently resuspended" to -- efficiently resuspending --
Line 14, change "FIG. 12 illustrate" to -- FIG. 12 illustrates --

Column 16,
Line 65, change "comprises" to -- comprise --

Column 20,
Line 9, change "is feed to" to -- is fed to --

Column 21,
Line 30, insert -- be -- before "separated, clarified"

UNITED STATES PATENT AND TRADEMARK OFFICE
CERTIFICATE OF CORRECTION

PATENT NO. : 6,719,681 B2
DATED : April 13, 2004
INVENTOR(S) : Kevin E. Collier

It is certified that error appears in the above-identified patent and that said Letters Patent is hereby corrected as shown below:

Column 25,
Line 17, change "to complementary fit" to -- to complementarily fit --
Line 53, change "are form with openings" to -- are formed with openings --
Line 56, change "as opposing to" to -- as opposed to --

Column 26,
Line 1, change "is feed into" to -- is fed into --
Line 23, change "being matching" to -- match --
Line 33, change "gravitational force" to -- centrifugal force --

Column 27,
Line 50, change "is subsequently" to -- it subsequently --

Column 28,
Line 4, change "not dawn out" to -- not drawn out --
Line 57, insert -- , -- after "Fluidising Apparatus"

Column 29,
Line 26, insert -- , -- after "In one embodiment"
Line 35, change "are note required" to -- are not required --

Column 30,
Lines 7 and 53, change "being feed" to -- being fed --

Column 31,
Line 33, insert -- of -- after "at least a portion"
Line 53, change "further comprises:" to -- further comprising: --

Column 32,
Lines 2, 9, 15 and 65, change "being feed" to -- being fed --
Line 10, insert -- the -- after "at least a portion or"

Column 33,
Lines 4, 11 and 17, change "being feed" to -- being fed --
Line 44, insert -- of -- before "particulate matter"

UNITED STATES PATENT AND TRADEMARK OFFICE
CERTIFICATE OF CORRECTION

PATENT NO.   : 6,719,681 B2
DATED        : April 13, 2004
INVENTOR(S)  : Kevin E. Collier It is certified that error appears in the above-identified patent and that said Letters Patent is hereby corrected as shown below:

Column 34,
Lines 4, 10, 17, 23 and 54, change "being feed" to -- being fed --

Signed and Sealed this

Twenty-second Day of March, 2005

JON W. DUDAS
*Director of the United States Patent and Trademark Office*